(12) United States Patent
Phely

(10) Patent No.: US 11,310,952 B2
(45) Date of Patent: Apr. 26, 2022

(54) SELF-CLEANING AGRICULTURE ROLLER

(71) Applicant: OTICO, Chalmaison (FR)

(72) Inventor: Olivier Phely, Thenisy (FR)

(73) Assignee: OTICO, Chalmaison (FR)

( * ) Notice: Subject to any disclaimer, the term of this patent is extended or adjusted under 35 U.S.C. 154(b) by 74 days.

(21) Appl. No.: 16/599,606

(22) Filed: Oct. 11, 2019

(65) Prior Publication Data

US 2020/0120852 A1    Apr. 23, 2020

(30) Foreign Application Priority Data

Oct. 12, 2018 (FR) ...................................... 18 59504

(51) Int. Cl.
*A01B 29/04* (2006.01)

(52) U.S. Cl.
CPC .................................. *A01B 29/043* (2013.01)

(58) Field of Classification Search
CPC ..... B60B 15/00; B60B 15/263; A01B 29/043; A01B 29/041; A01B 29/02; B60C 5/20; B60C 5/22; B60C 5/24
See application file for complete search history.

(56) References Cited

U.S. PATENT DOCUMENTS

| | | | | |
|---|---|---|---|---|
| 2,040,710 A * | 5/1936 | Riehl | ................... | A01B 29/041 172/154 |
| 2,127,075 A * | 8/1938 | Venosta | ................. | B60C 11/22 152/342.1 |
| 2,445,503 A * | 7/1948 | Williams | ................ | B60C 11/22 152/339.1 |
| 2,751,959 A * | 6/1956 | Blomquist | ............. | B60B 11/00 152/416 |
| 2,903,037 A * | 9/1959 | Palmer | .................... | B60C 27/22 152/218 |
| 3,338,315 A * | 8/1967 | Ketel | ................... | A01B 29/041 172/537 |
| 5,788,335 A * | 8/1998 | O'Brien | ................. | B60B 15/26 301/40.6 |
| 5,810,451 A * | 9/1998 | O'Brien | ................... | B60B 3/02 152/210 |
| 6,022,082 A * | 2/2000 | O'Brien | ............... | B60B 15/263 152/216 |

(Continued)

FOREIGN PATENT DOCUMENTS

| | | |
|---|---|---|
| DE | 1 680 531 A1 | 4/1971 |
| EP | 0 878 328 A1 | 11/1998 |

(Continued)

OTHER PUBLICATIONS

French Preliminary Search Report dated Jul. 8, 2019 in French Application 18 59504, filed on Oct. 12, 2018 (with English Translation of Categories of Cited Documents).

*Primary Examiner* — Jessica H Lutz
(74) *Attorney, Agent, or Firm* — Oblon, McClelland, Maier & Neustadt, L.L.P.

(57) ABSTRACT

An agricultural roller comprises a tubular support and a series of pneumatic tyres mounted on the support. Each pneumatic tyre of the series has a respective uninflated envelope. The roller further comprises a series of tyres mounted on the support and interleaved in the series of pneumatic tyres. Each tyre has a respective envelope. The tyres are smaller than the pneumatic tyres while their envelope is narrower.

15 Claims, 14 Drawing Sheets

(56) References Cited

U.S. PATENT DOCUMENTS

| | | | | |
|---|---|---|---|---|
| 6,470,935 B1* | 10/2002 | Fulsang | ............... | B60C 5/22 |
| | | | | 152/329 |
| 8,108,099 B2* | 1/2012 | Sawada | ............ | B60C 23/002 |
| | | | | 701/36 |
| 8,887,825 B2* | 11/2014 | Valier | ............... | A01B 29/04 |
| | | | | 172/260.5 |
| 9,744,804 B2* | 8/2017 | Pope | ............ | B60B 11/06 |
| 2003/0071515 A1* | 4/2003 | Elkow | ............... | B60B 11/00 |
| | | | | 301/36.1 |
| 2008/0135153 A1* | 6/2008 | Sawada | ............... | B60C 5/22 |
| | | | | 152/516 |
| 2013/0037284 A1* | 2/2013 | Phely | ............... | A01B 29/043 |
| | | | | 172/537 |
| 2014/0124112 A1* | 5/2014 | Phely | ............ | B60C 5/12 |
| | | | | 152/450 |
| 2018/0092283 A1* | 4/2018 | Piou | ............... | A01B 29/043 |
| 2018/0370283 A1* | 12/2018 | Impens | ............... | B60C 7/12 |

FOREIGN PATENT DOCUMENTS

| | | |
|---|---|---|
| FR | 2 694 863 A1 | 2/1994 |
| FR | 2 776 239 A1 | 9/1999 |
| FR | 2 784 331 A1 | 4/2000 |
| WO | WO 2018/172461 A1 | 9/2018 |

\* cited by examiner

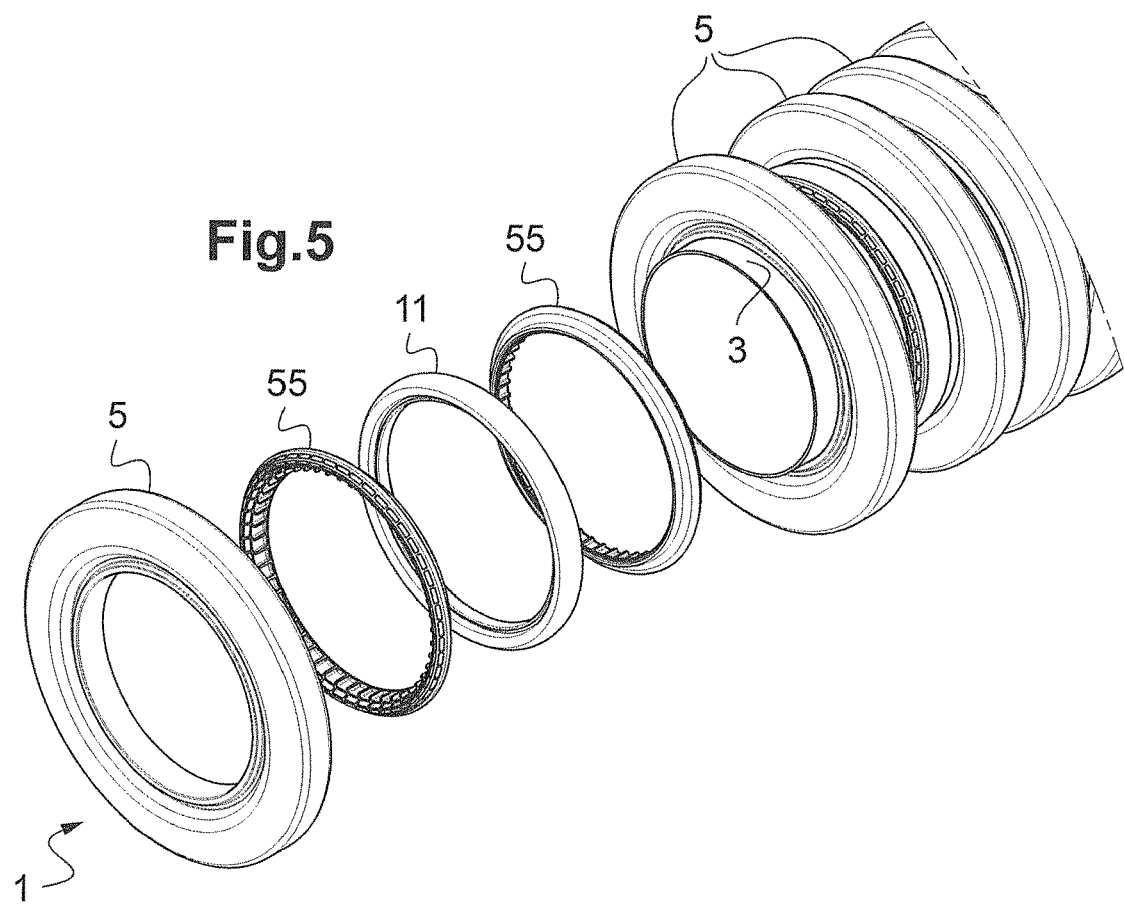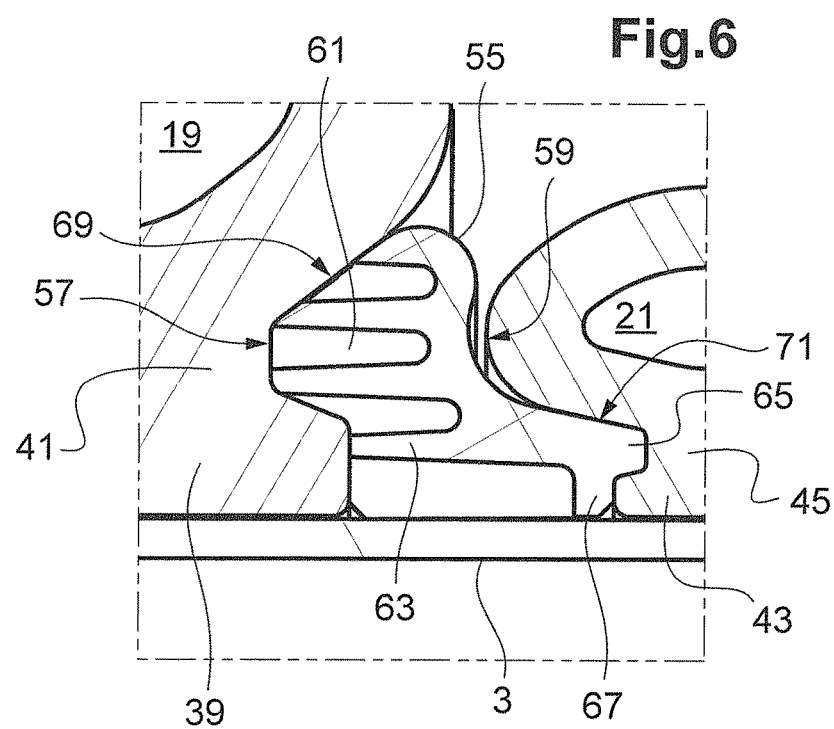

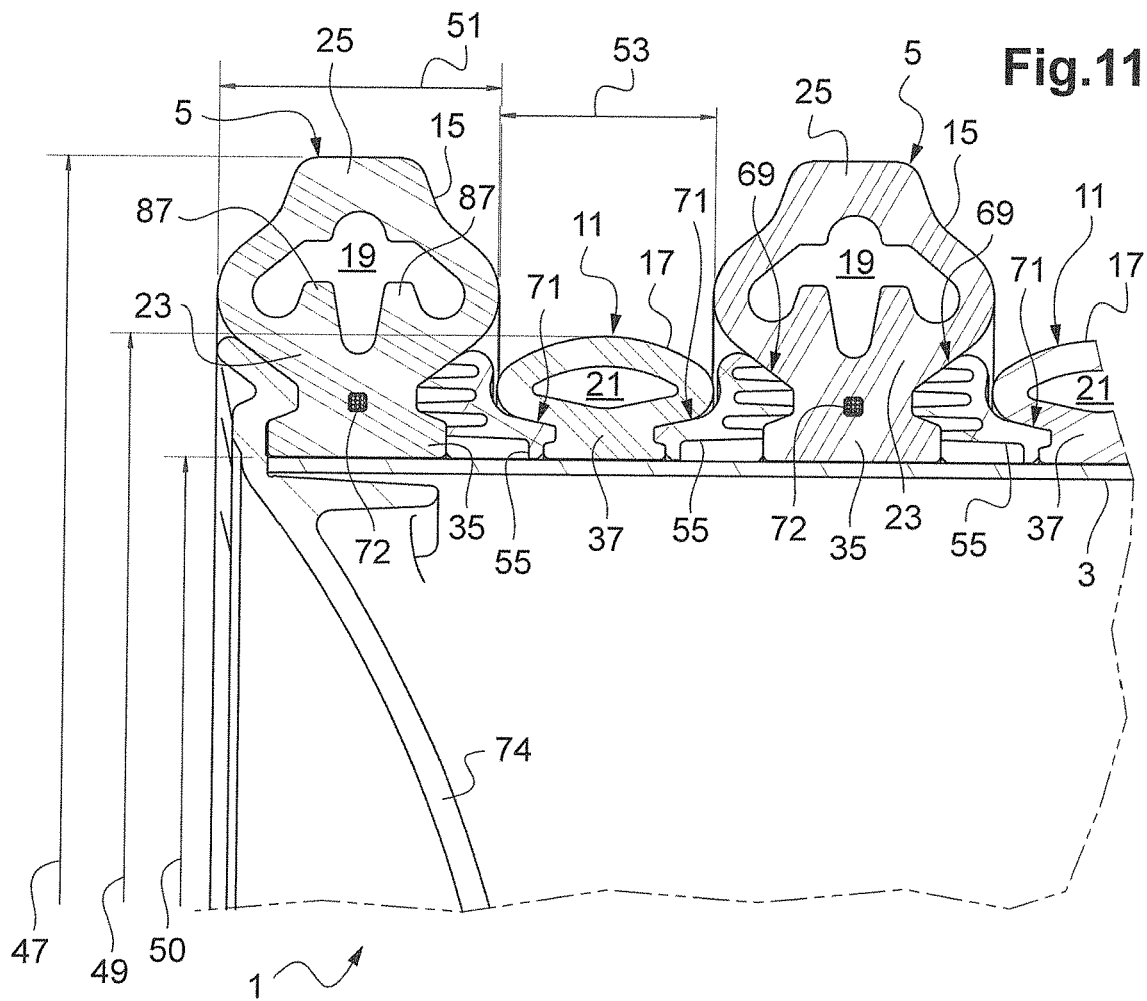
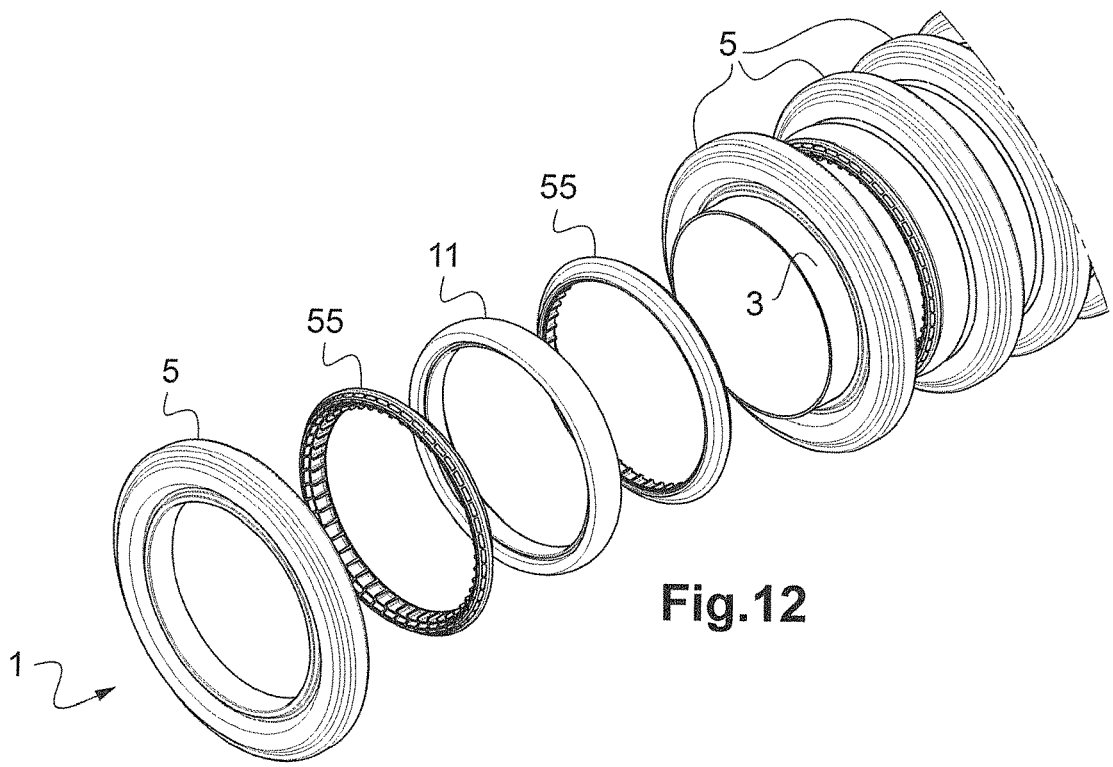

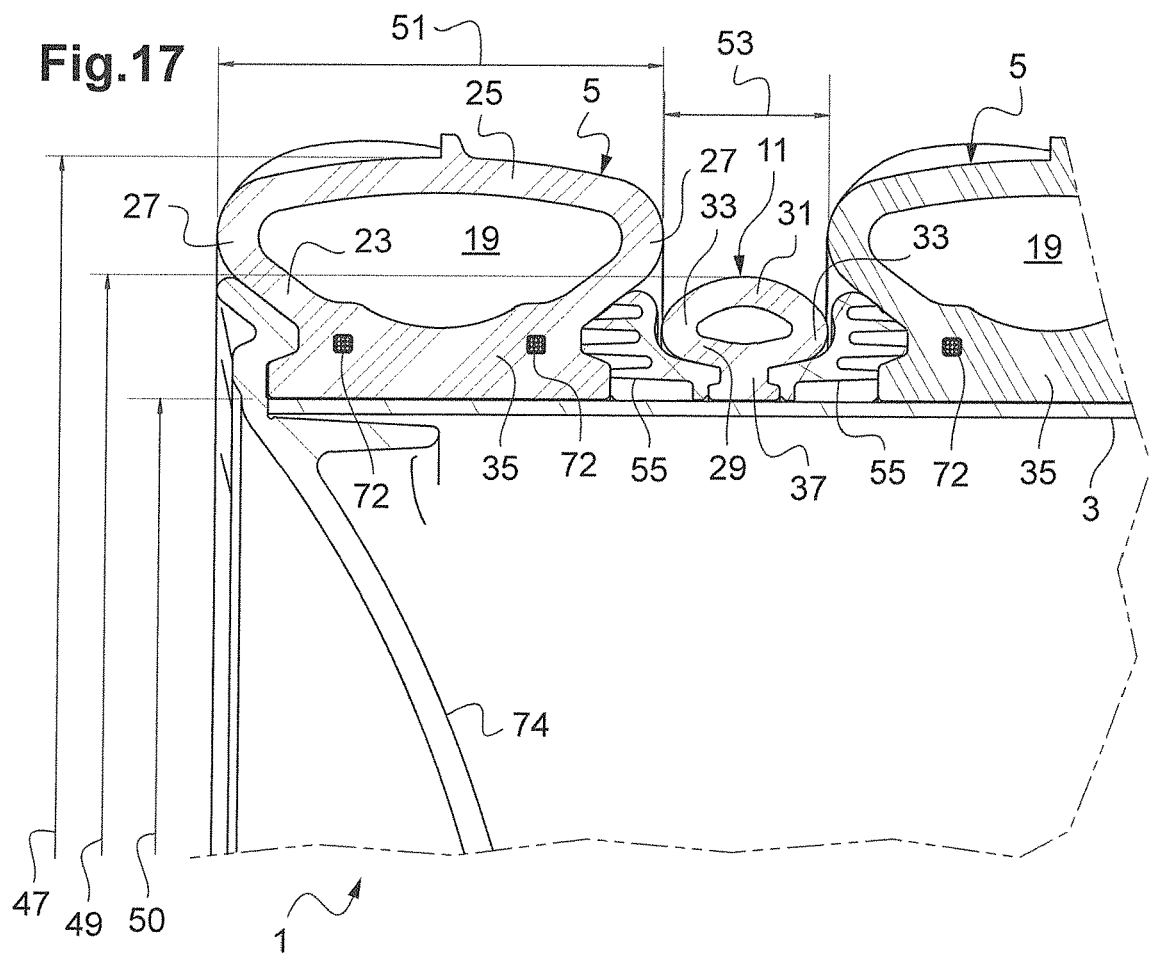
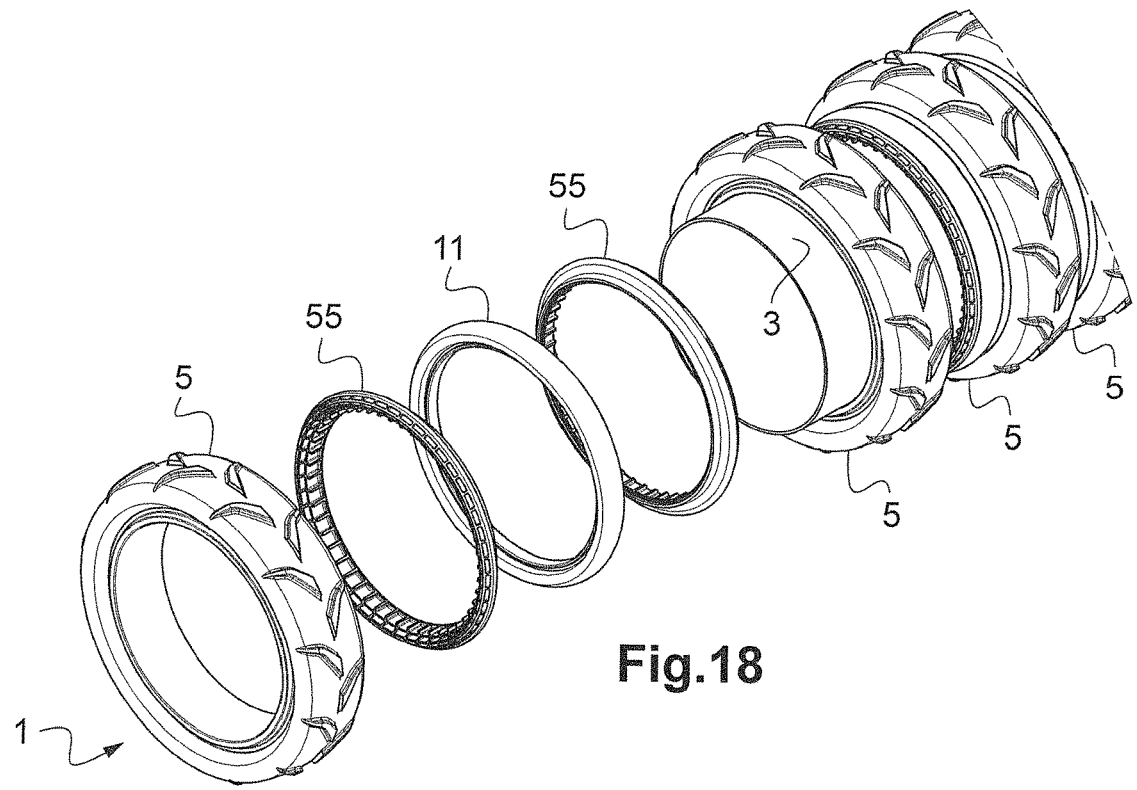

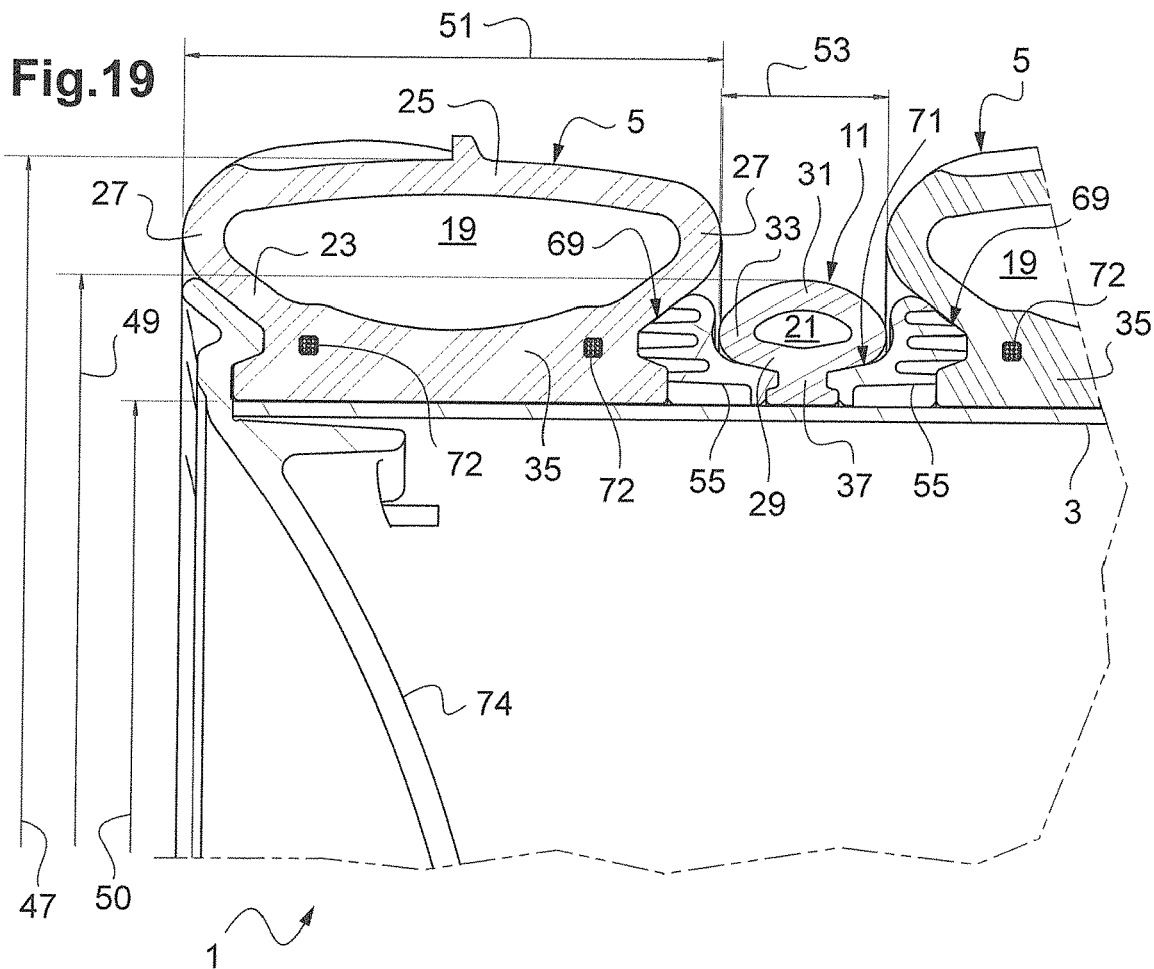
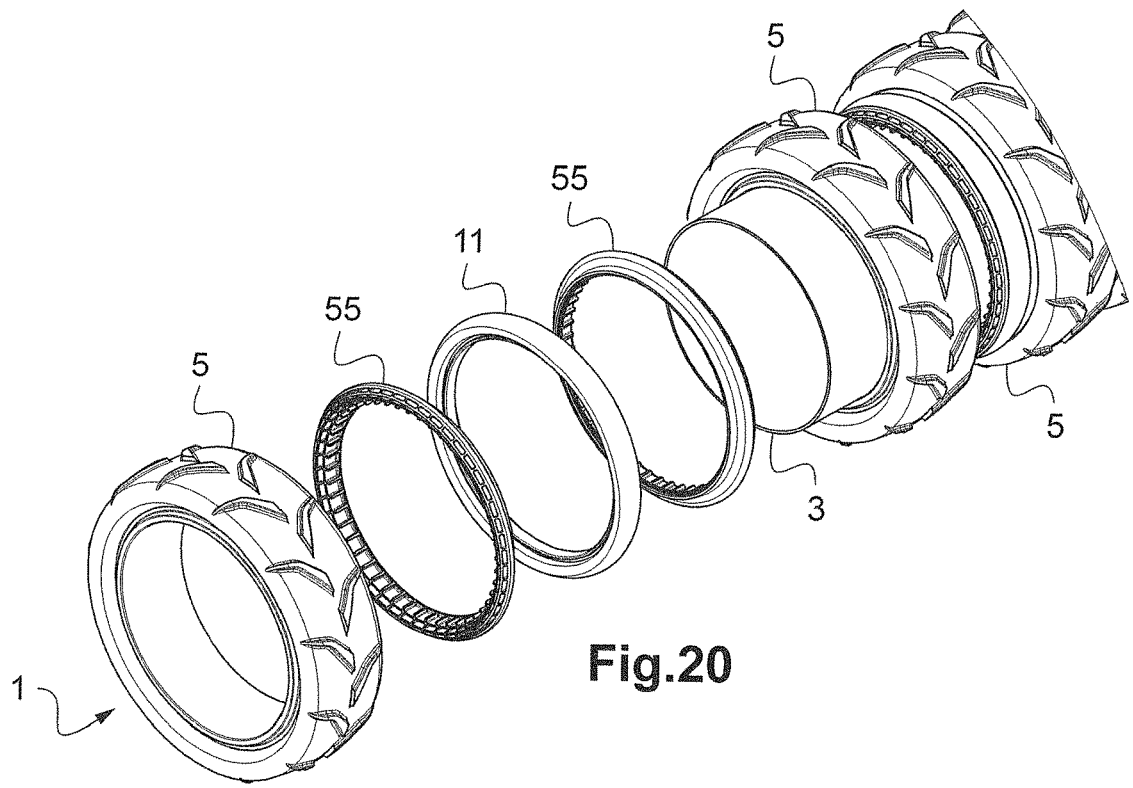

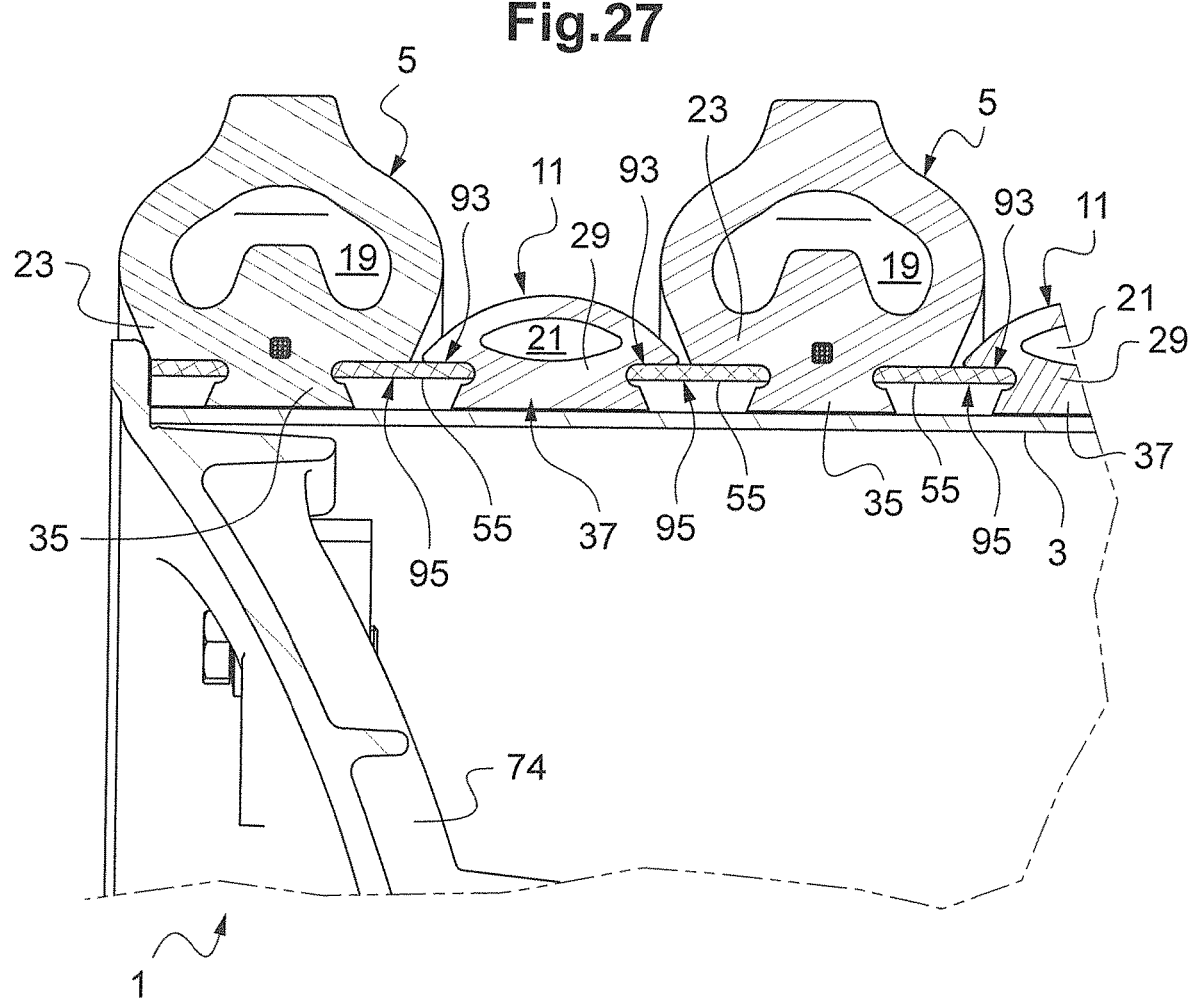

SELF-CLEANING AGRICULTURE ROLLER

The invention concerns an agricultural roller of the type comprising a tubular support and at least a first series of pneumatic tyres threaded onto the tubular support, each pneumatic tyre of this first series having a respective envelope.

A roller of this kind is known for example from FR 2 763 279 A1 in the name of the Applicant, which document describes in detail pneumatic tyres for use with this roller. These pneumatic tyres have a radial section such that the domed profile rolling portion is not crushed too much under load whilst having sufficient flexibility to enable the pneumatic tyres to be deformed.

This type of roller can be used to work fields that are furrowed. It may be used with a seed drill to form in the soil furrows intended to receive seeds. It may also be used to replace the soil after sowing. It may be used on its own or in combination with other tools such as a seed drill or soil preparation tools.

Rollers of this type are conventionally equipped with special pneumatic tyres the shape of which is adapted to suit the function of the roller in the field. Some of these pneumatic tyres are of semi-hollow type. Semi-hollow pneumatic tyres are pneumatic tyres the envelope of which is neither inflated nor inflatable.

This type of pneumatic tyre is satisfactory. However, under certain working conditions sticky soil, wet soil or mud tends to soil the equipment and to reduce its efficiency. It is known to use metal scrapers to clean the pneumatic tyres during use. The metal scrapers are of complementary shape to the pneumatic tyres and attached to the chassis. They are interleaved between the pneumatic tyres of the roller.

The Applicant has noticed that the presence of the scrapers increases the risks of deterioration and of perforation of the pneumatic tyres. In the event of accidental contact between the scrapers and the pneumatic tyres, or in the presence of a stone, for example, the pneumatic tyres may be damaged. The Applicant has therefore attempted to reduce the above risks.

The Applicant has therefore designed pneumatic tyres of semi-hollow type the self-cleaning properties of which are such that it becomes possible to dispense with scrapers. Certain of these pneumatic tyres have a profile such that the rolling band preserves its functional shape when working, whereas the sidewalls are greatly deformed. When working, the rolling band may, for example, be moved radially if the pneumatic tyre is crushed by the weight of the agricultural machine. This radial movement of the rolling band or the deformation of the sidewalls detaches the soil without reducing the effectiveness of the roller.

Pneumatic tyres of this type are globally satisfactory. The Applicant has nevertheless attempted to go still further by considering the cleaning of the roller as a whole and not cleaning only the pneumatic tyres with which it is equipped.

It is in fact found that soil can accumulate between the pneumatic tyres of the roller, even if the pneumatic tyres have good self-cleaning properties. To prevent such accumulation scrapers are conventionally installed that act between the pneumatic tyres. However, the installation of such scrapers complicates the design, manufacture and maintenance of the rollers.

The invention improves on this situation.

There is proposed an agricultural roller of the type comprising a tubular support and a series of pneumatic tyres mounted on the support. Each pneumatic tyre of the series has a respective uninflated envelope. The roller further comprises a series of tyres, mounted on the support and interleaved in the series of pneumatic tyres. Each tyre has a respective envelope. The tyres are smaller than the pneumatic tyres while their envelope is narrower.

The proposed roller offers improved performance regarding the cleaning thereof in that the gap between two pneumatic tyres is partly filled by a self-cleaning tyre. This tyre prevents soil from accumulating between two mutually adjacent pneumatic tyres.

Other features and advantages of the invention will appear on examining the following detailed description and the appended drawings, in which:

FIG. 5 is an exploded view of a portion of the roller form FIG. 1;

FIG. 6 shows a detail VI of the roller from FIG. 4;

FIGS. 11 and 12 are analogous to FIGS. 7 and 8, respectively, and show a further variant embodiment of the roller from FIGS. 1 to 6;

FIGS. 17 and 18 are analogous to FIGS. 7 and 8, respectively, and show a further variant embodiment of the roller from FIGS. 1 to 6;

Figure 1:
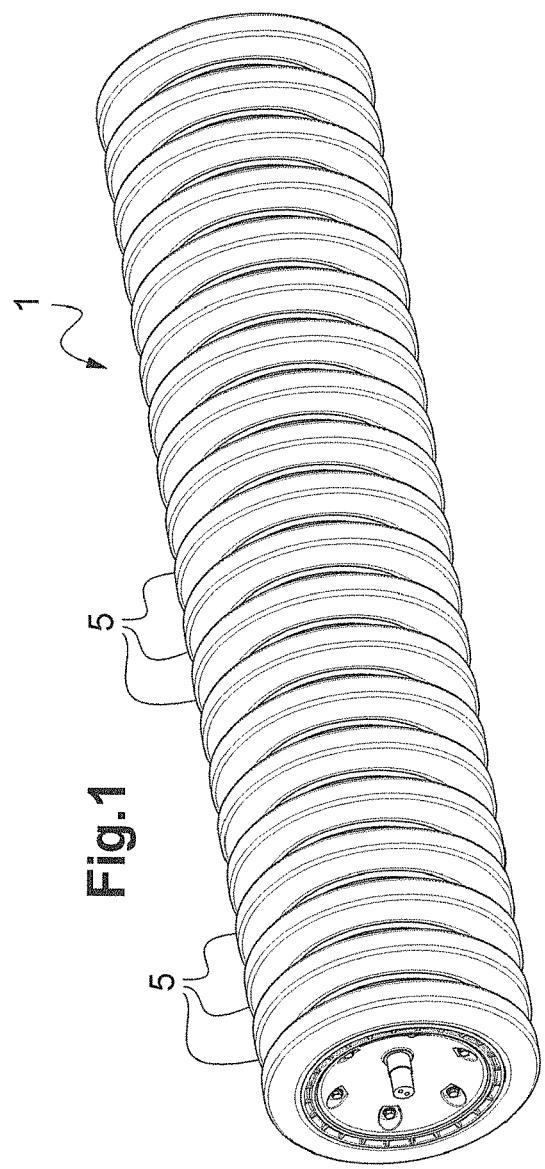
FIG. 1 is an isometric perspective view of an agricultural roller according to the invention.
Figure 2:
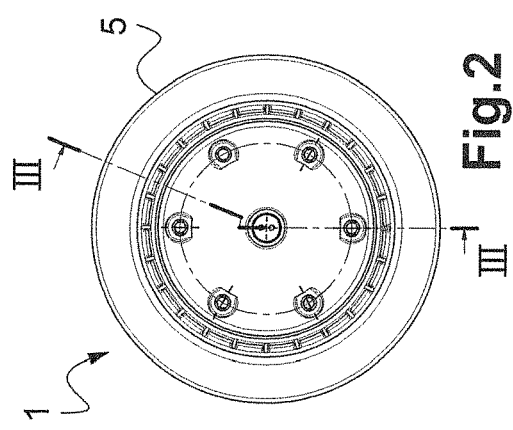
FIG. 2 shows a front view of the roller from FIG. 1.
Figure 3:
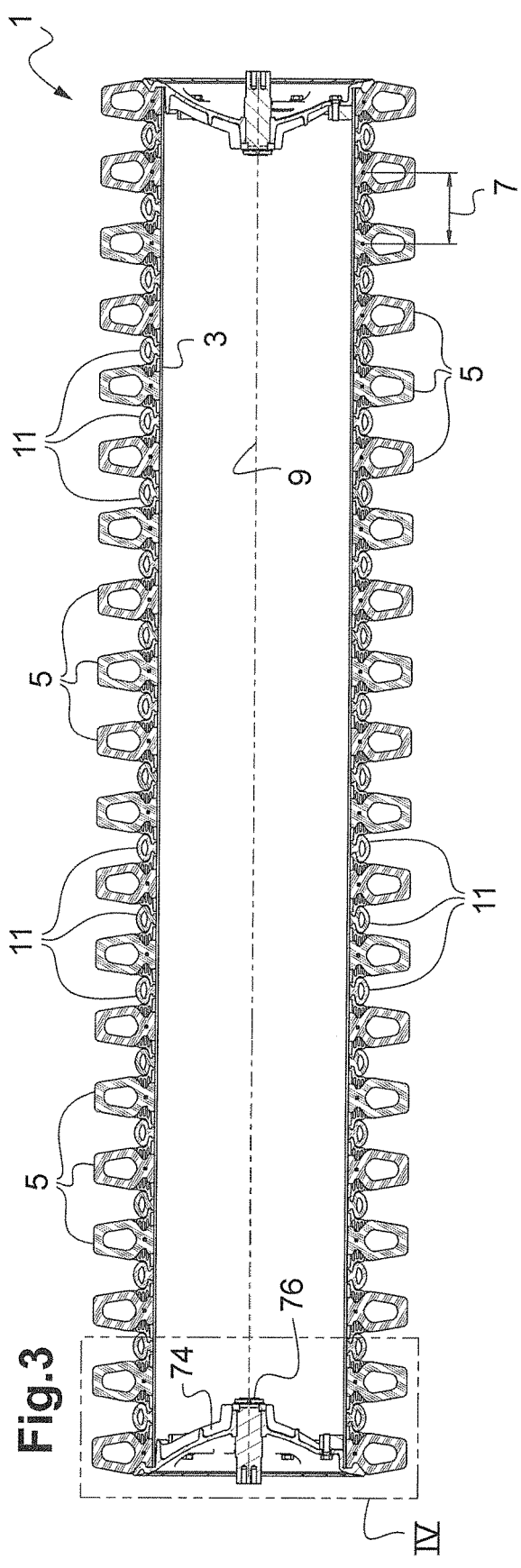
FIG. 3 shows the roller in section taken along the line III-III in FIG. 2.
Figure 4:
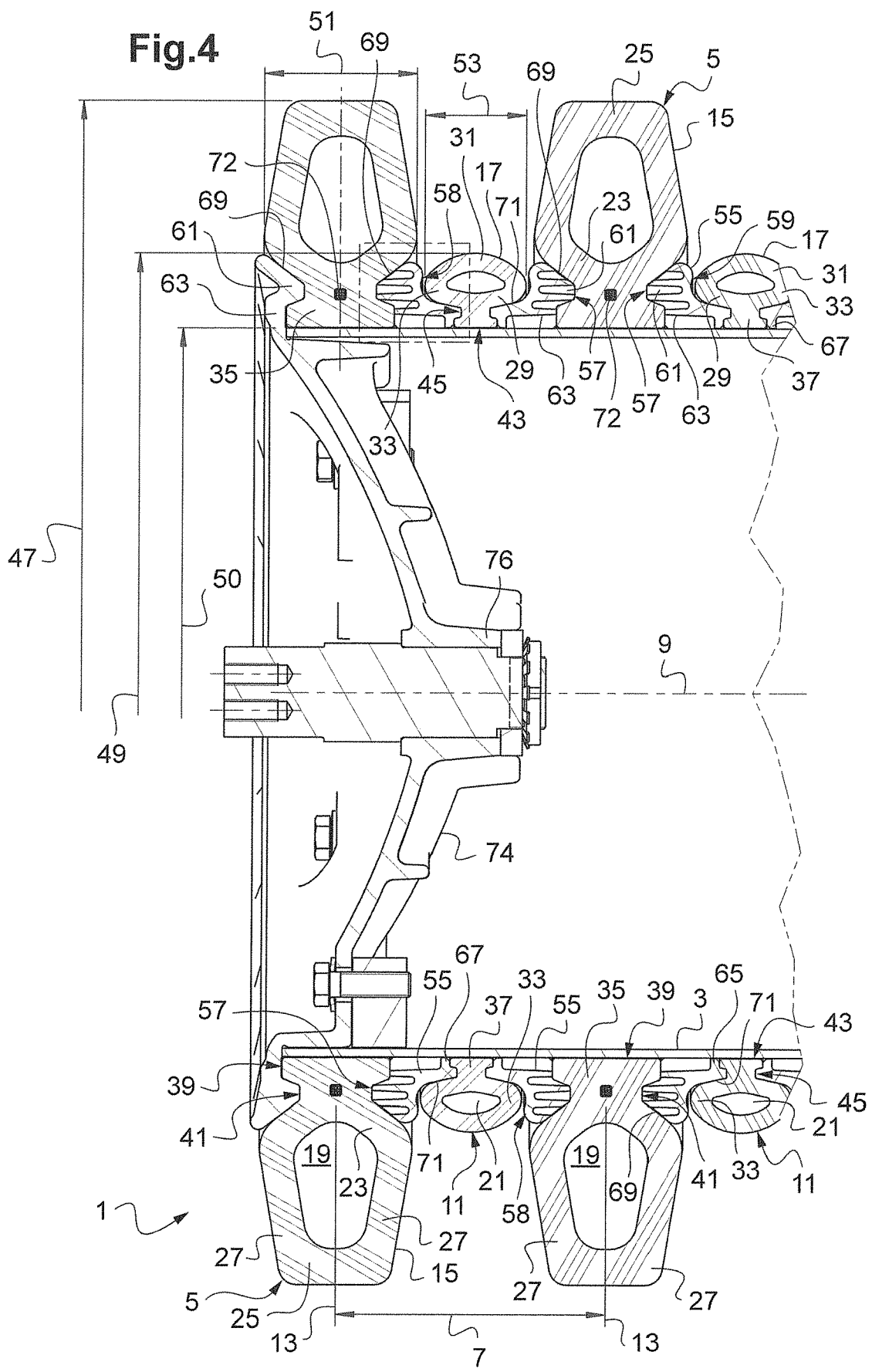
FIG. 4 shows a detail IV of the roller from FIG. 3.
Figure 7:
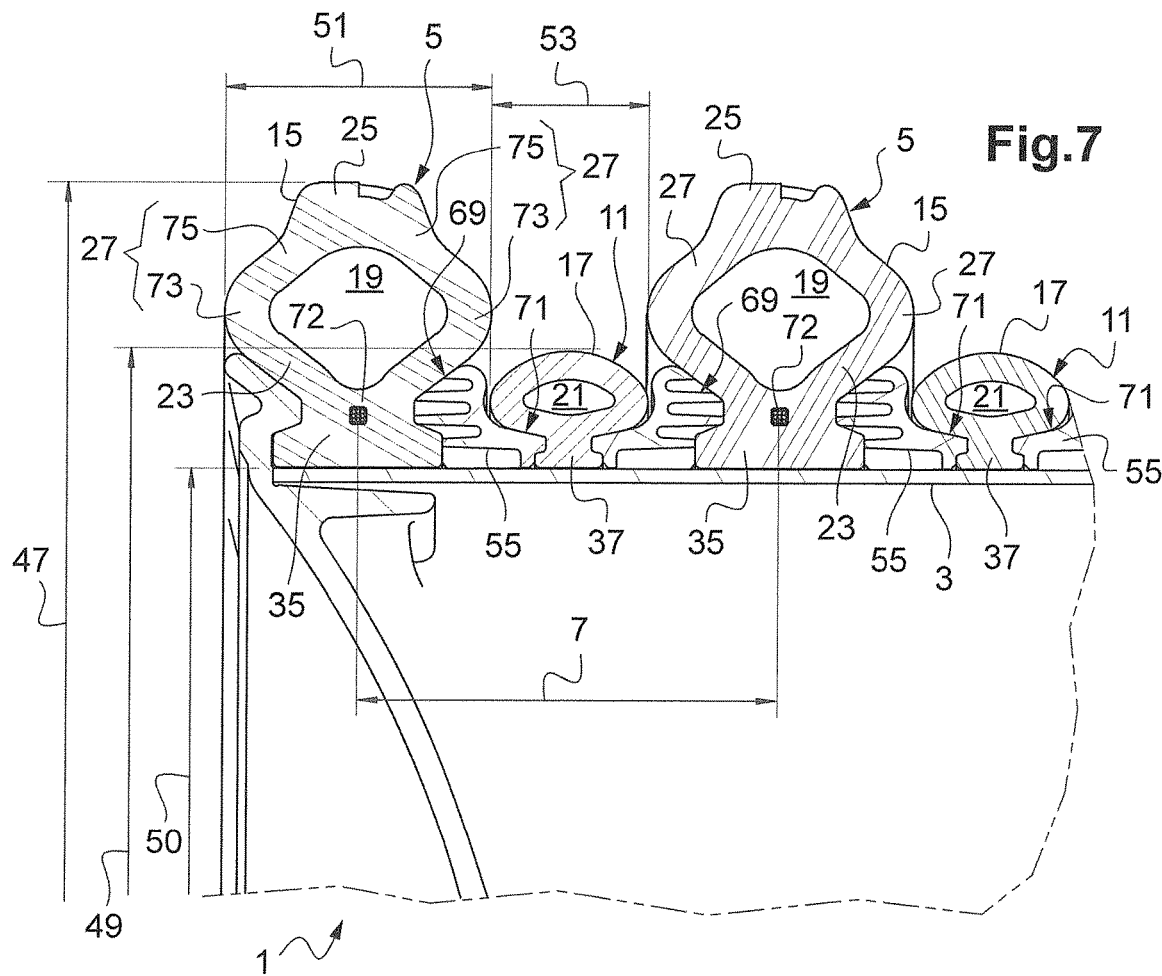
FIG. 7 shows a longitudinal section of part of a variant embodiment of the roller from FIGS. 1 to 6.
Figure 8:
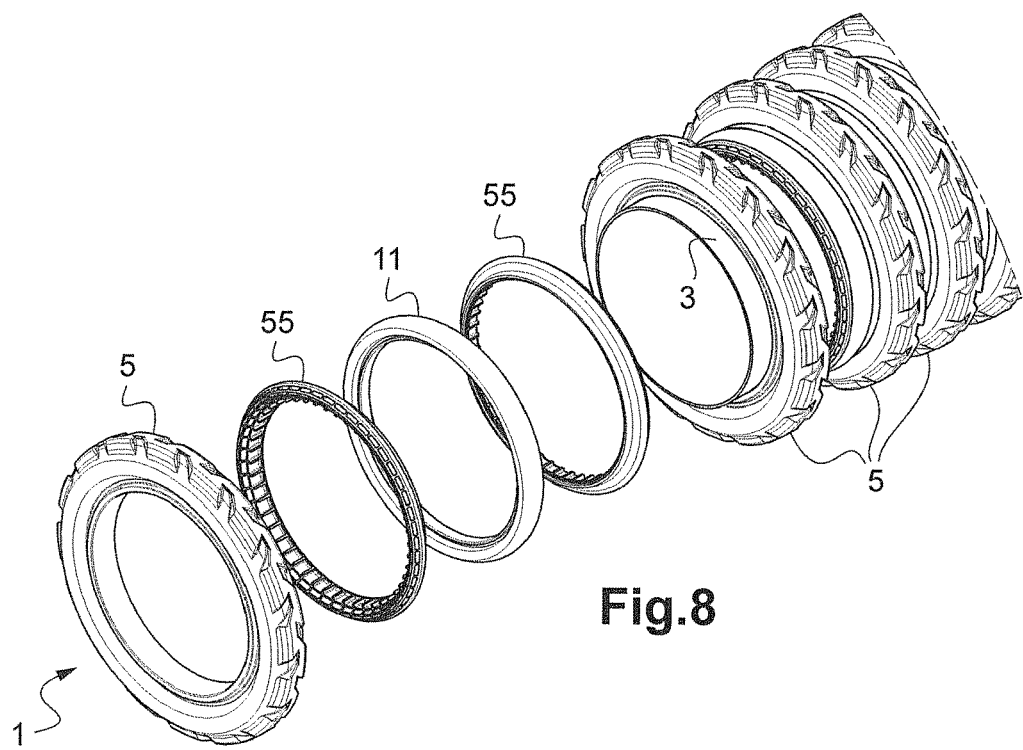
FIG. 8 is an exploded view of a portion of the roller from FIG. 7.
Figure 21:
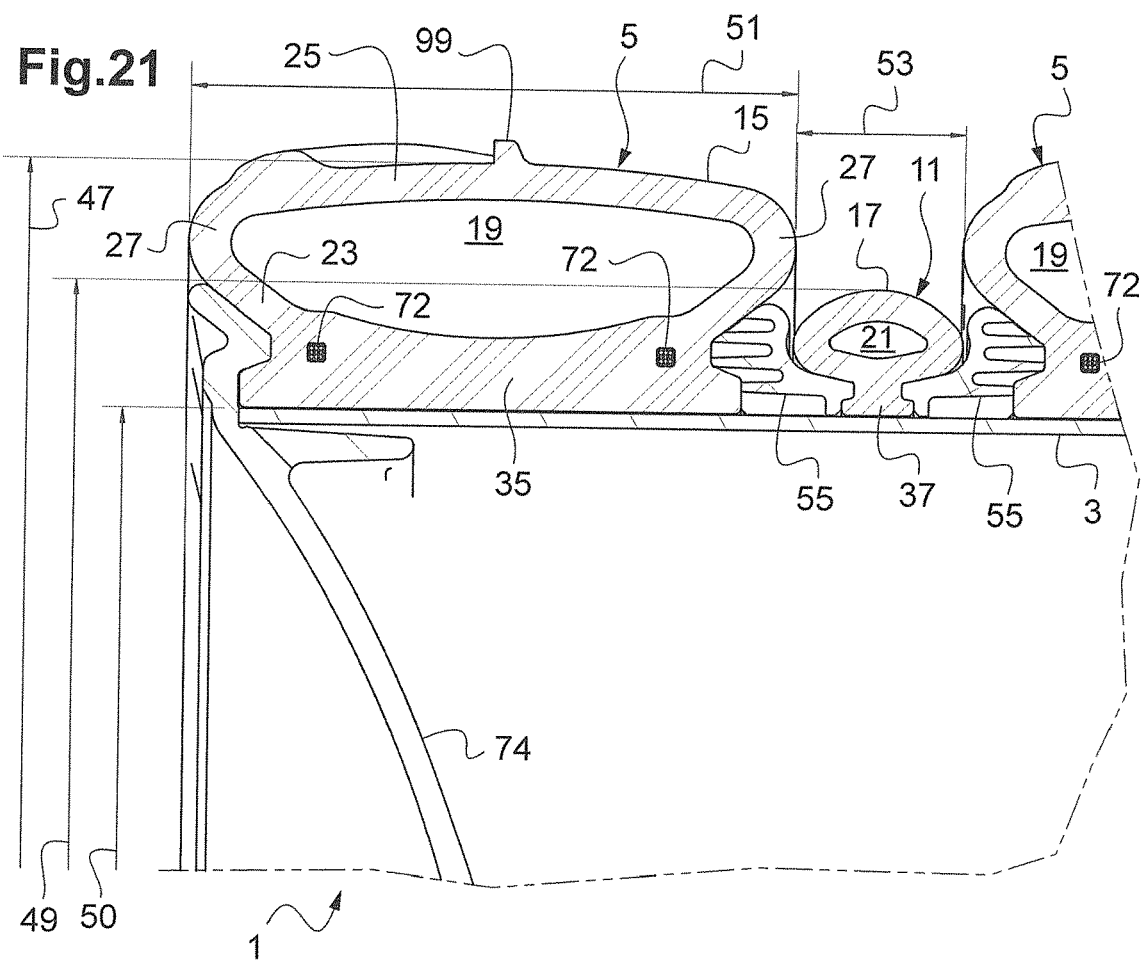
Figure 22:
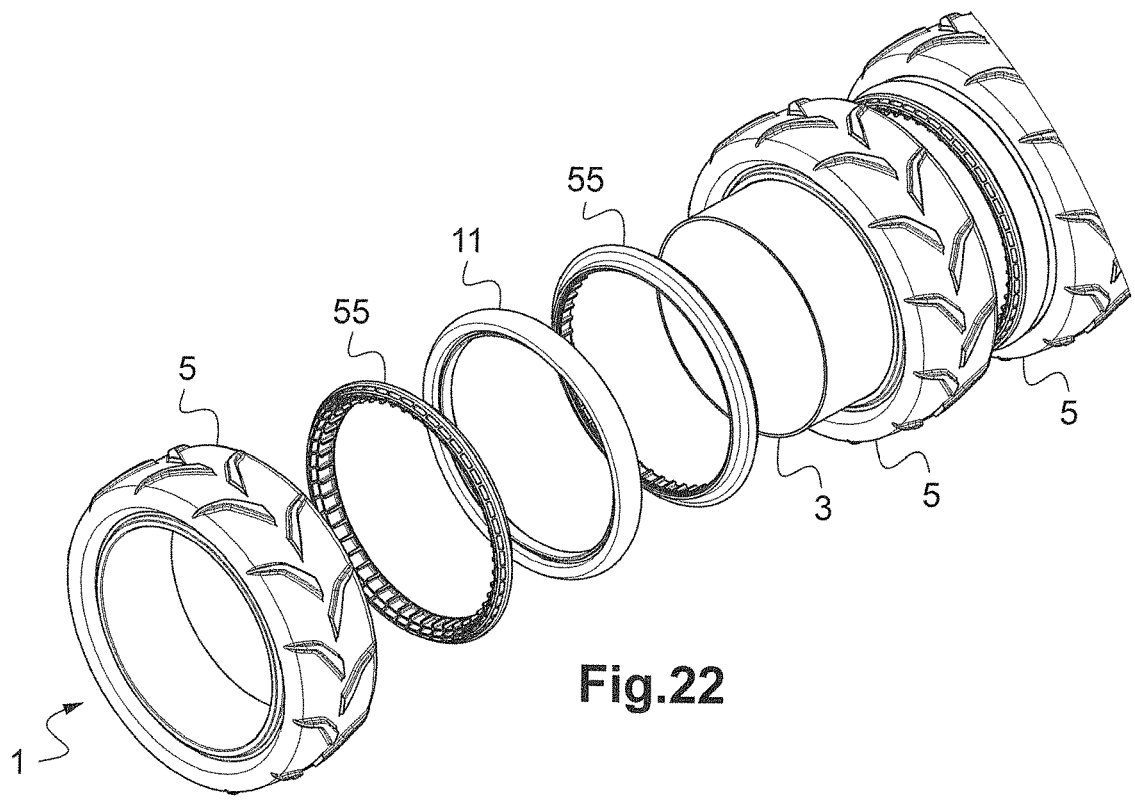
Figure 23:
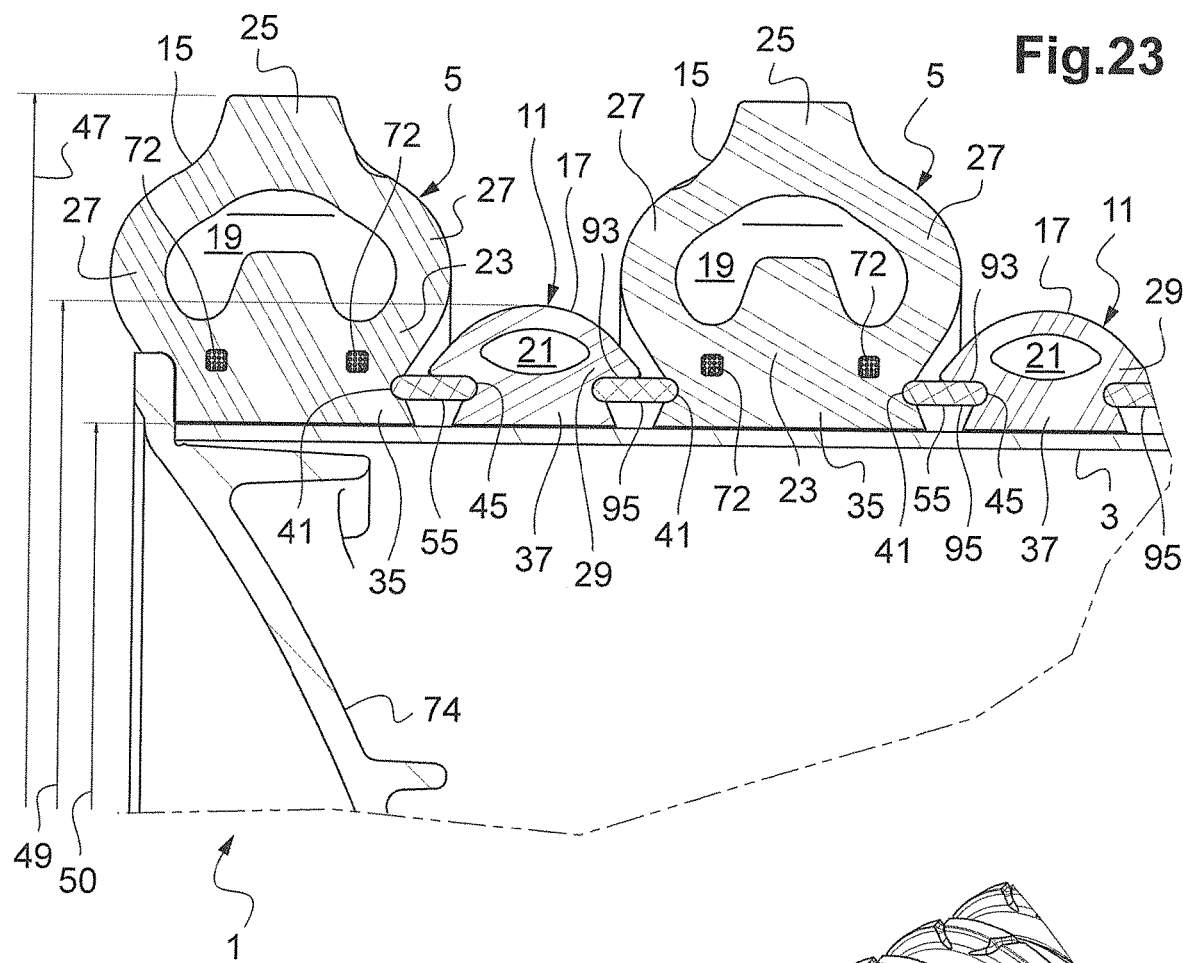
Figure 24:
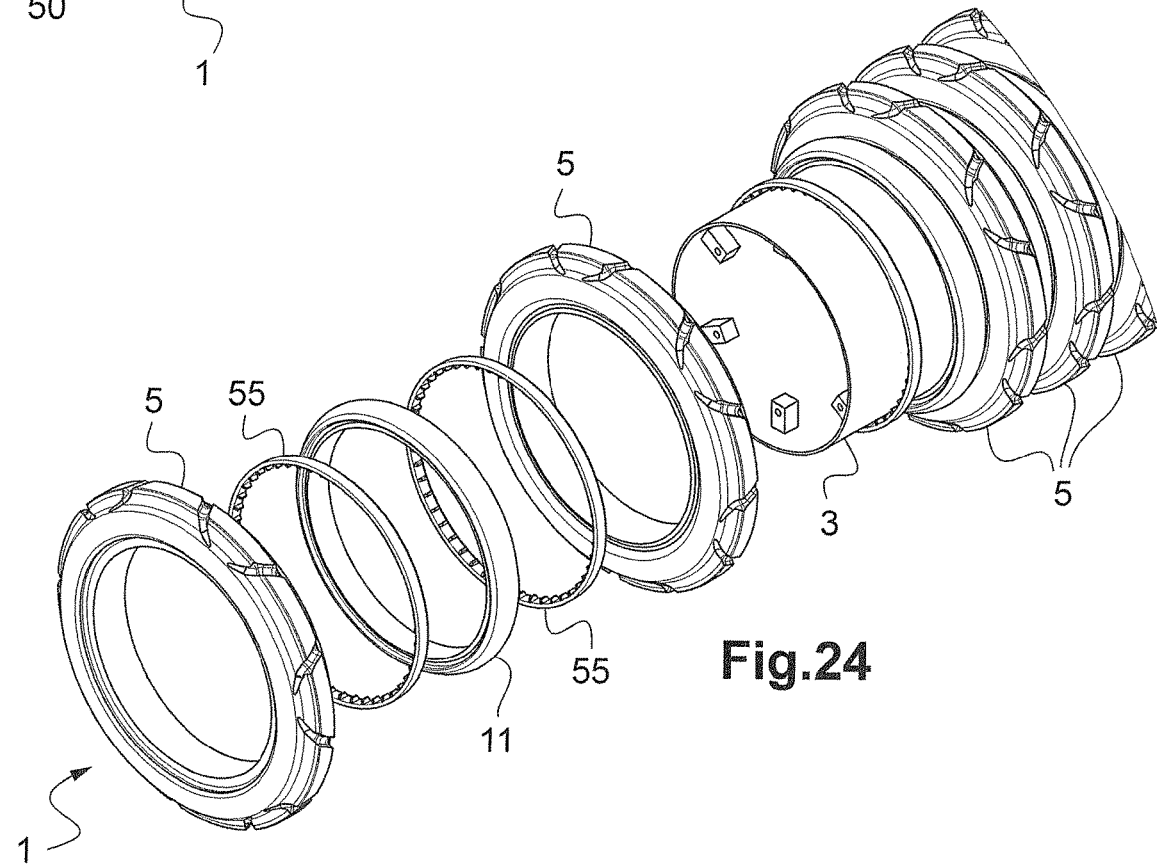
Figure 25:
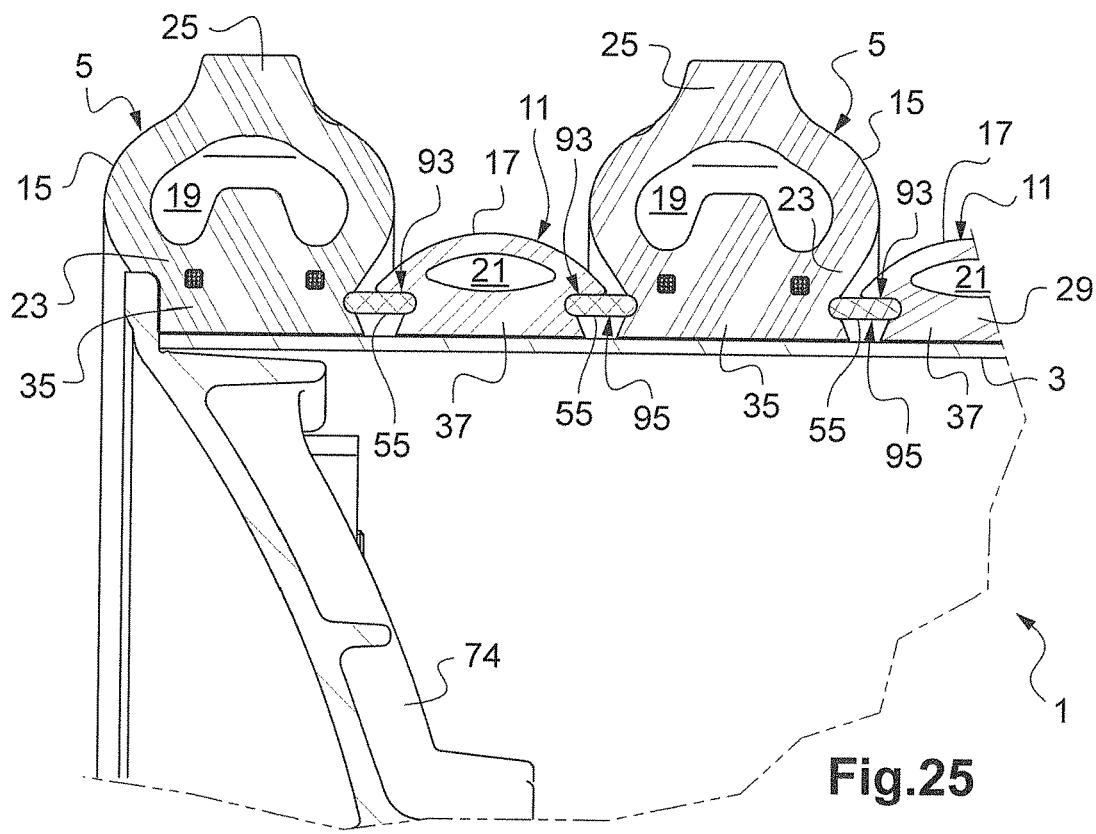
Figure 26:
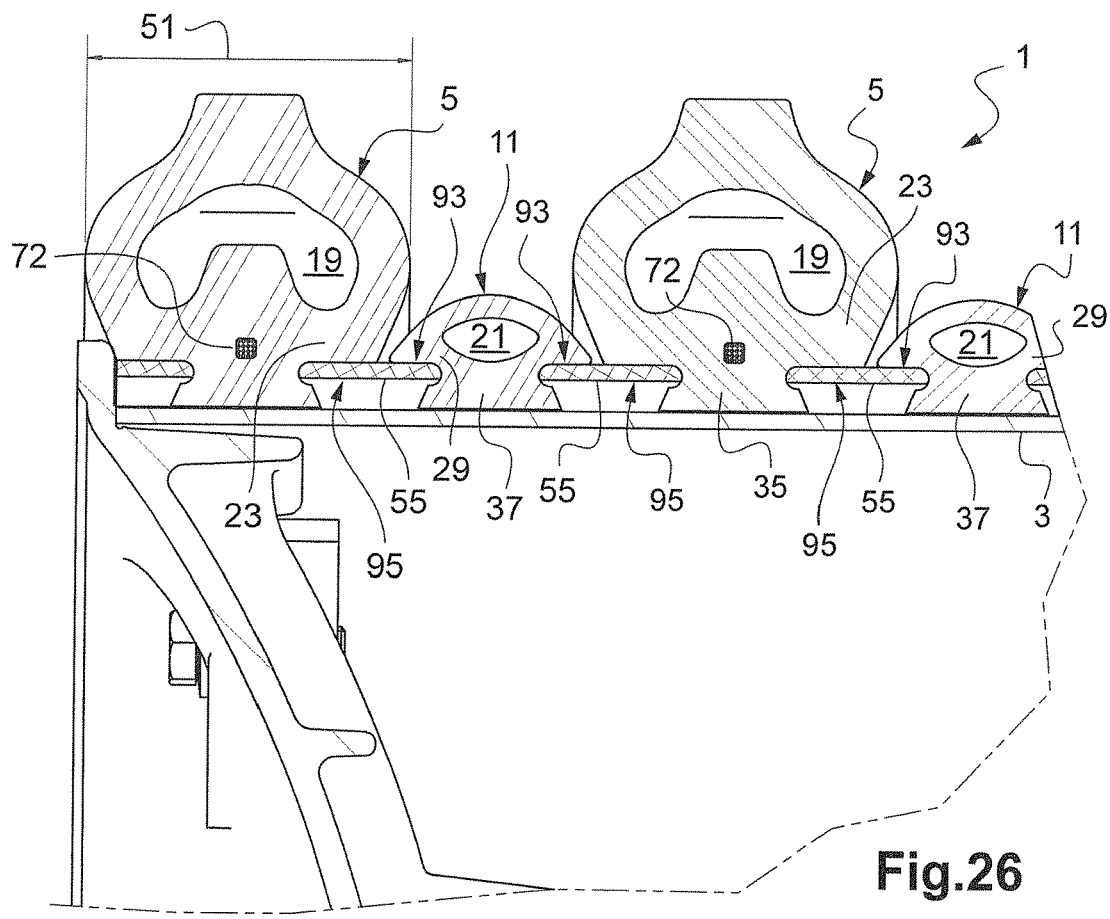

FIGS. 19 and 20 are analogous to FIGS. 7 and 8, respectively, and show a further variant embodiment of the roller from FIGS. 1 to 6; and FIGS. 21 and 22 are analogous to FIGS. 7 and 8, respectively, and show a further variant embodiment of the roller from FIGS. 1 to 6;

FIGS. 23 and 24 are analogous to FIGS. 7 and 8, respectively, and show a further variant embodiment of the roller from FIGS. 1 to 6;

FIG. 25 is analogous to FIG. 23 and shows a development of the variant embodiment from FIGS. 23 and 24;

FIGS. 26 and 27 are analogous to FIG. 23 and show a further development of the variant embodiment from FIGS. 23 and 24.

The following description and the drawings essentially contain elements of a certain character. They could therefore serve not only to explain the present invention better but also to contribute to its definition if necessary.

Reference is made to FIGS. 1 to 6.

An agricultural machine element includes a roller 1, here of furrower type. The roller 1 comprises a tubular, generally cylindrical support 3 and a plurality of analogous pneumatic tyres of a first type, or first pneumatic tyres 5, analogous to one another. The first pneumatic tyres 5 are threaded around the tubular support 3 so as to be aligned with one another. The first pneumatic tyres 5 are aligned in the longitudinal direction on the support 3. The first pneumatic tyres 5 are distributed over the length of the support 3 at a constant pitch 7.

The roller 1 is intended to be mounted on and to rotate about the axis 9 of the support 3, typically on the chassis of an agricultural machine (not shown).

Movement of the chassis in question drives rotation of the roller 1 by reaction of the first pneumatic tyres 5 on the ground. The first pneumatic tyres 5 work the ground into parallel furrows. Here the shape of the first pneumatic tyres 5 enables them to be used to form the furrows. The first pneumatic tyres 5 are the active elements of the roller 1, in that it is them that mostly serve to work the soil.

The pitch 7 corresponds to what is known in the art as the inter-row distance, that is to say the distance between two adjacent furrows in the field.

The roller 1 further comprises a plurality of analogous pneumatic tyres of a second type, or second pneumatic tyres 11. The second pneumatic tyres 11 are threaded around the support 3 so as to be aligned with one another. The second pneumatic tyres 11 are aligned in the longitudinal direction of the support 3.

The second pneumatic tyres 11 are interleaved between the first pneumatic tyres 5. A second pneumatic tyre 11 is interleaved each time between two adjacent first pneumatic tyres 5. The second pneumatic tyres 11 are regularly distributed along the support 3 at a pitch identical to the pitch 7 of the first pneumatic tyres 5.

The first pneumatic tyres 5 and the second pneumatic tyres 11 have a circular shape about a respective central axis. The first pneumatic tyres 5 and the second pneumatic tyres 11 are mounted in a centred manner on the support 3, that is to say the central axis of these pneumatic tyres substantially coincides with the axis 9 of the support 3.

In the figures, the first pneumatic tyres 5 and the second pneumatic tyres 11 are shown as in the absence of exterior loading (free of exterior stress).

Each of the first pneumatic tyres 5 and the second pneumatic tyres 11 has a median plane 13 orthogonal to their central axis. The first pneumatic tyres 5 and the second pneumatic tyres 11 have a generally symmetrical appearance with respect to their median plane 13.

The first pneumatic tyres 5 and the second pneumatic tyres 11 respectively comprise an envelope of a first type, or first envelopment 15, and an envelope of second type, or second envelope 17.

Each of the first envelopes 15 and the second envelopes 17 consists of a tyre, also called skin. Each of the first envelopes 15 and the second envelopes 17 is made in one piece and constituted of a flexible material, typically a natural rubber, one or more elastomers, such as polyurethane for example, or a mixture of natural rubber and elastomer. The flexible material has for example a Shore A hardness between 50 and 70 inclusive. The material of the first envelope 15 may differ from that of the second envelope 17.

Each of the first envelopes 15 and the second envelopes 17 has a circular appearance about the central axis and occupies the circumference of the first pneumatic tyres 5 and the second pneumatic tyres 11, respectively. Each of the first envelopes 15 and the second envelopes 17 defines a respective first chamber 19 and a respective second chamber 21. Each of the first chambers 19 and the second chambers 21 communicates with the outside via at least one opening (not shown). The first chambers 19 and the second chambers 21 are not inflatable, which renders the first envelopes 15 and the second envelopes 17 deformable. The first pneumatic tyres 5 and the second pneumatic tyres 11 are of semi-hollow type. The first envelopes 15 and the second envelopes 17 have the median plane 13 of the first pneumatic tyres 5 and the second pneumatic tyres 11 as their median plane and plane of symmetry.

The first envelopes 15 and the second envelopes 17 are generally annular. Each of the first envelopes 15 includes an interior peripheral portion 23 and an exterior peripheral portion 25 radially opposite the interior portion 23. Each of the first envelopes 15 further includes two lateral portions 27, mutually opposite in the axial direction, each of which connects the interior portion 23 to the exterior portion 25. The exterior portion 25 of the first envelopes 15 constitutes the rolling band of the first pneumatic tyres 5. The lateral portions 27 may be termed sidewalls.

Each of the second envelopes 17 includes an interior peripheral portion 29 and an exterior peripheral portion 31 radially opposite the interior portion 29. Each of the second envelopes 17 further includes two lateral portions 33, mutually opposite in the axial direction, each of which connects the interior portion 29 and the exterior portion 31. The exterior portion 31 of the second envelopes 17 constitutes the rolling band of the second pneumatic tyres 11, the lateral portions 33 the sidewalls.

The first pneumatic tyres 5 and the second pneumatic tyres 11 respectively comprise a part forming a heel of a first type, or first heel 35, and a part forming a heel of a second type, or second heel 37. The first heels 35 and the second heels 37 are respectively connected to the interior wall 23 of the first envelopes 15 and the interior wall 29 of the second envelopes 17. The first heels 35 and the second heels 37 project radially toward the interior of the first envelopes 15 and the second envelopes 17, respectively. The first heels 35 and the second heels 37 are in one piece with the first envelopes 15 and the second envelopes 17, respectively.

Each of the first heels 35 includes a flared peripheral portion, or base 39, and a narrow intermediate portion, or neck 41, which connects the base 39 to the first envelope 15. In an analogous manner, each of the second heels 37 comprises a base 43 connected to the second envelope 17 via a neck 45. The bases 39 of the first heels 35 and the bases 43 of the second heels 37 constitute interior peripheral portions of the first pneumatic tyres 5 and the second pneumatic tyres 11, respectively.

Here the first heels 35 and the second heels 37 have profiles in the general shape of a T, the branches of which form the bases 39 and 43, and the body the necks 41 and 45.

Here the first pneumatic tyres 5 and the second pneumatic tyres 11 are mounted on the support 3 by means of the bases 39 and 43 of the first heels 35 and the second heels 37, respectively.

The second pneumatic tyres 11 are smaller than the first pneumatic tyres 5. The first pneumatic tyres 5 have an outside diameter 47, or diameter OD1, that is substantially greater than an outside diameter 49, or diameter OD2, of the second pneumatic tyres 11. In particular, the diameter OD2 is between 60 and 90 percent inclusive of the diameter OD1. The first pneumatic tyres 5 and the second pneumatic tyres 11 have an inside diameter 50, or diameter ID, that corresponds here to the outside diameter of the support 3.

Line I in Table A groups dimensional values used in particular to produce the first pneumatic tyres 5 and the second pneumatic tyres 11 according to FIGS. 1 to 6. The corresponding line of Table B shows a diameter OD2 that is 26 percent less than the diameter OD1.

Moreover, the second pneumatic tyres 11 have a second envelope 17 narrower than the first envelope 15 of the first pneumatic tyres 5. The first envelopes 15 have a width 51, or width W1, that is greater than the width 53 of the second envelope 17, or width W2. The width of an envelope is understood here as the greatest dimension of that envelope in the axial direction in a stress free state. The width W2 of the second envelopes 17 is less than 80 percent of the width W1 of the first envelopes 15. The dimensions in line I of Table A correspond to a width W2 of the second envelopes 17 that is 34 percent less than the width W1 of the first envelopes 15 (corresponding line in Table B).

The width W1 of the first envelopes 15 is mainly determined by the agricultural function of the first pneumatic tyres 5, here the formation of furrows. The pitch P of the first pneumatic tyres 5 is also determined by the agricultural function of the first pneumatic tyres 5, here the inter-row distance, the distance separating two adjacent furrows from one another.

The width W2 of the second envelopes 17 is determined so that their deformation acts against any accumulation of soil between the first pneumatic tyres 5. The width W2 of the second envelopes 17 is greater than the difference between the pitch P of the first pneumatic tyres 5 and the width W1 of the first envelopes 15, or at least 80 percent greater than that difference. In the example corresponding to line I, the width W2 of the second envelopes 17 corresponds to 86 percent of the difference in question.

The width W2 of the second envelopes 17 corresponds to a diametral position of those envelopes that is less than the diametral position corresponding to the width W1 of the first envelopes 15. Here the width W2 of the second envelopes 17 corresponds to the spacing of the lateral portions 33 substantially at the level of the neck 41 of the first pneumatic tyres 5. The exterior portions 31 of the second envelopes 17 are located on a diameter less than the smallest diameter of the lateral portions 27 of the first envelopes 15. By deforming, the first pneumatic tyres 5 could in certain cases at least come into contact with the second pneumatic tyres 11.

The roller 1 further comprises a plurality of flanges 55 analogous to one another. The flanges 55 are threaded around the tubular support 3 in a manner aligned with one another. The flanges 55 are aligned in the longitudinal direction of the support 3. The flanges 55 are distributed over the length of the support 3, interleaved between the first pneumatic tyres 5 and the second pneumatic tyres 11. A flange 55 is interleaved between each first pneumatic tyre 5 and an adjacent second pneumatic tyre 11.

Each flange 55 has a first large face 57 and an axially opposite second large face 59. The first face 57 is adapted at least in part to maintain the first heels 35 by cooperation of shapes. Each first face 59 has an annular zone the profile of which is complementary to at least a part of the profile of the first heels 35. In particular, the profile of this annular zone comprises an axially projecting portion 61 shaped to be engaged in the neck 41 of the first pneumatic tyres 5 and an axially recessed portion 63 radially adjacent to the projecting portion 61 in which the base 39 of the first heels 35 can be engaged.

The second face 59 is shaped with respect to the second pneumatic tyres 11 in a homologous manner to the first face 57 and the first pneumatic tyres 5. Each second face 59 comprises an annular zone the profile of which is complementary to at least a part of the profile of the second heels 37, here with a projecting portion 65 and a recessed portion 67 the shapes of which cooperate respectively with the neck 45 and the base 43 of the second pneumatic tyres 11.

The flanges 55 are organised in pairs on the support 3. In each pair, one of the flanges 55 is threaded onto the support 3 via its second face 59 while the other is threaded onto the support 3 via its first face 57. Each pair of flanges 55 contributes to retaining a respective first pneumatic tyre 5 on the support 3. Moreover, each of the flanges 55 of a pair contributes conjointly with a flange 55 of an adjacent pair to retaining on this support 3 an adjacent second pneumatic tyre 11. The flanges 55 moreover act in relation to the first pneumatic tyres 5 and the second pneumatic tyres 11 of the roller 1 as spacers. In the axial direction the first pneumatic tyres 5 and the second pneumatic tyres 11 bear on one another via the flanges 55. The flanges 55 preserve the spacing between the first pneumatic tyres 5 on the one hand and between the first pneumatic tyres 5 and the second pneumatic tyres 11 on the other hand.

Each of the flanges 55 includes at least one generally annular surface forming a peripheral half-seat for the first pneumatic tyres 5, or first half-seat 69. The first half-seats 69 are shaped to receive at least in part the interior portion 23 of the first envelopes 15. The first half-seats 69 are arranged on the first face 57 of the flanges 55. These first half-seats 69 are radially adjacent to the projecting portions 61 of the first faces 57 of the flanges 55. Each pair of flanges 55 therefore carries the seat surface, or seating, of a first type, around which a respective first pneumatic tyre 5 is engaged.

Here each of the flanges 55 further includes at least one generally annular surface forming a peripheral half-seat for the second pneumatic tyres 11, or second half-seats 71. The second half-seats 71 are shaped to receive at least in part the interior portion 29 of the second envelopes 17. The second half-seats 71 are arranged on the second face 59 of the flanges 55. The second half-seats 71 are radially adjacent to the projecting portions 65 on the second faces 59 of the flanges 55. Two adjacent flanges 55 of two adjacent pairs therefore carry a seat surface of a second type around which a respective second pneumatic tyre 11 is engaged.

The flanges 55 are rigid. The flanges 55 are for example made of plastic material.

Each of the second envelopes 17 defines a hollow cavity consisting of the second chamber 21 located between two larger first envelopes 15. Each of the second envelopes 17 rests on a respective intermediate seat between the respective seats of adjacent first envelopes 15.

The roller 1 is equipped with pneumatic tyres that might be described as staggered, because this roller 1 combines first pneumatic tyres 5 and second pneumatic tyres 11 and the first pneumatic tyres 5 have an outside diameter 47 significantly greater than the outside diameter 49 of the second pneumatic tyres 11.

The use of staggered pneumatic tyres improves the self-cleaning of the roller 1 as a whole, because:

the first pneumatic tyres 5 are self-cleaning;

the space between the first pneumatic tyres 5 is occupied by second pneumatic tyres 11, also self-cleaning.

It is therefore possible to dispense with any additional cleaning device, in particular analogous to the row of scrapers that is conventionally mounted on agricultural rollers.

The lateral portions 27 of the first envelopes 15, through which the first pneumatic tyres 5 penetrate into the soil, are not axially (laterally) loaded. These lateral portions 27 free to be crushed at least part or to be moved, by deforming the first envelope 15. This deformation or this movement cleans the first pneumatic tyres 5 or at least prevents the accumulation of soil on them.

With a smaller diameter, the second pneumatic tyres 11 comprise a second envelope 15 surrounding a second chamber 21. The second chambers 21 allow the second envelopes 17 to be deformed, preventing soil becoming jammed between the first pneumatic tyres 5. The second pneumatic tyres 11 are also free to be deformed axially (laterally) in the vicinity of their rolling band so that soil does not accumulate there.

Here the interior portion 23 of the first envelopes 15 has a complex profile. This interior portion 23 rests on a first seat consisting of the first half-seats 69 of two adjacent flanges 55. The exterior portion 25 of these first envelopes 15 has a rectilinear profile that extends parallel to the axis of the first pneumatic tyres 5. The lateral portions 27 have a rectilinear profile inclined to the radial direction so that these lateral portions 27 become closer together in the radially outward direction.

The interior portions 29 of the second envelopes 17 is very slightly concave. This interior portion 29 rests on a second seat consisting of the second half-seats 71 of two adjacent flanges 55. The profile, the lateral portions 33 and the exterior portions 31 are mutually connected with no discontinuity and with a curvature of constant sign. The second pneumatic tyres 11 have a profile of mushroom general shape.

Each of the first heels 35 houses an armature element, here in the form of a for example metal ring 72. Here this element is housed at the level of the neck 41 of the first heel 35. The second pneumatic tyres 11 have no armature, at least no rigid armature, which confers on them very great flexibility.

The roller 1 further comprises a pair of end flanges 74 that are mounted at each end of the tubular support 3. Here the end flanges 74 carry a hub 76 by means of which the roller 1 is rotatably mounted on an agricultural machine. Each end flange 74 has in the vicinity of its periphery an annular portion of corresponding shape to the large faces of the flange 55. Here this portion carries a projecting portion analogous to the projecting portion 61 of the flanges 55, a recessed portion analogous to the recessed portion 63 of those flanges, and a surface forming a half-seat analogous to the half-seats 69 of the flanges 55. This enables retention of the first pneumatic tyres 5 that are located in the vicinity of the ends of the support 3 between a flange 55 and an end flange 74.

Reference is made to FIGS. 7 and 8.

A variant of the roller 1 is distinguished from that described with reference to FIGS. 1 to 6 firstly in the profile of the first pneumatic tyres 5.

The interior portion 23 of the first envelopes 15 is convex. This interior portion 23 extends axially and radially beyond the first half-seat 69. This interior portion 23 is connected to the lateral portions 27 by a clear rounded profile portion 73. This rounded profile 73 forms a zone of inflection between the lateral portions 27 and the interior portion 23. This inflection zone enables the first pneumatic tyres 5 to collapse radially when they are loaded radially inwards, in particular in operation, compressing the first chambers 19. The exterior portion 25 is narrower than the interior portion 23. The exterior portion 25 is connected to the lateral portions 27 by a fillet profile portion 75.

Line II in Table A groups a set of dimensions to be used for example to produce a roller 1 according to FIGS. 7 and 8.

Line II in Table A and the corresponding line in Table B show that the pitch P of the first pneumatic tyres 5 is significantly less than the sum of the width W1 of the first envelopes 15 and that W2 of the second envelopes 17, despite two flanges 55 interleaved between two adjacent first pneumatic tyres 5. This is a result of the fact that the lower portion 23 of the first envelopes 15 projects axially beyond the first half-seats 69 and radially outwards, beyond an axial end of the second envelopes 17. The second envelopes 17 are partly housed radially under the first portion 23 of the first envelopes 15.

The outside diameter 49 of the second pneumatic tyres 11 remains less than the greatest diameter of the lower portion 23 of the first envelopes 15.

Figure 9:
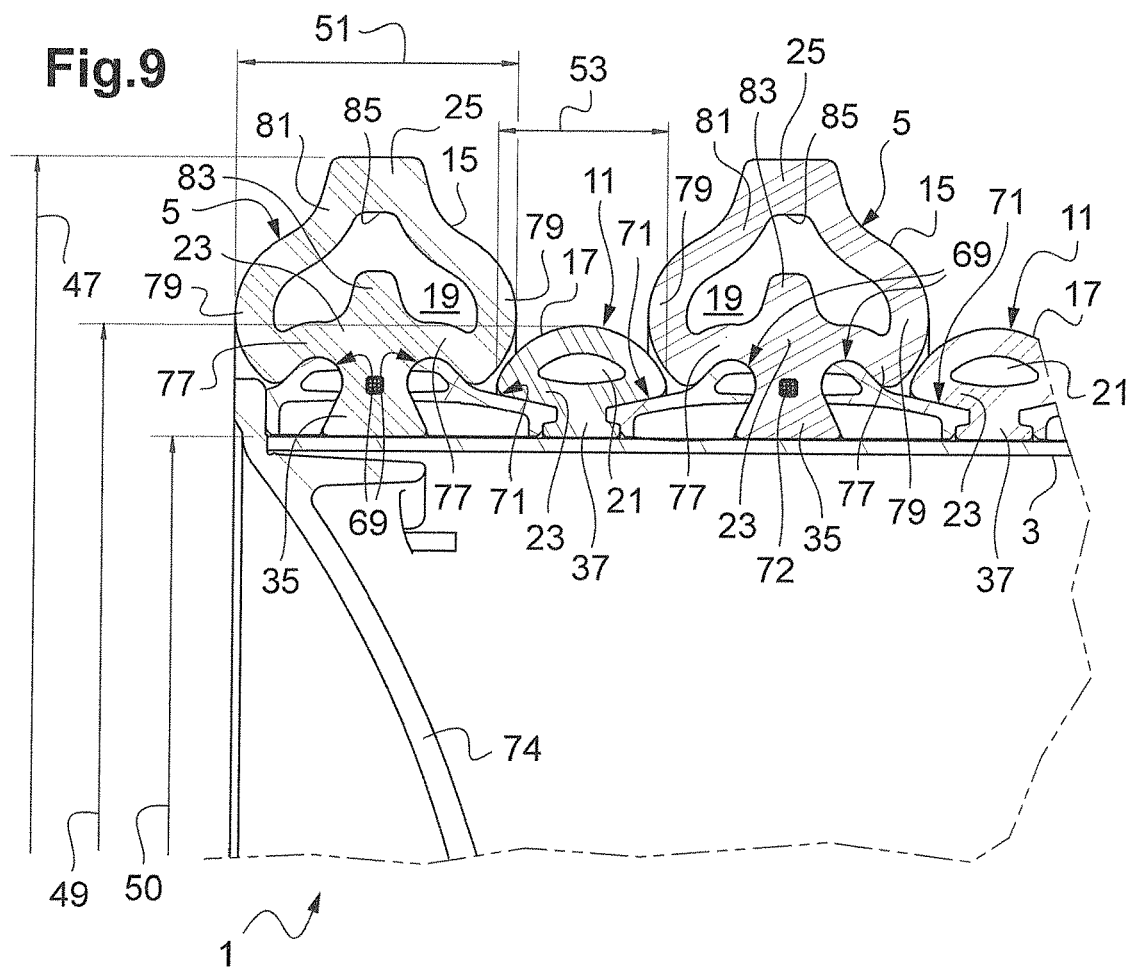
FIGS. 9 and 10 are analogous to FIGS. 7 and 8, respectively, and show another variant embodiment of the roller from FIGS. 1 to 6.
Figure 10:
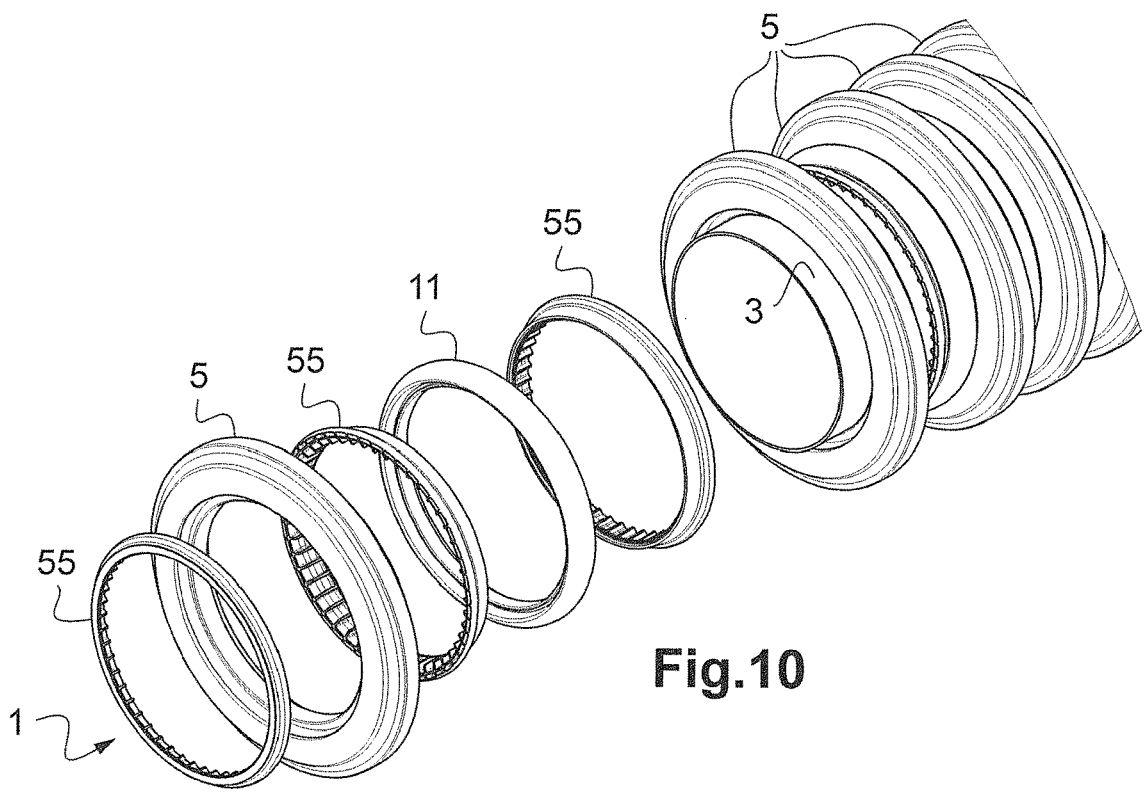

Reference is made to FIGS. 9 and 10.

Another variant of the roller 1 from FIGS. 1 to 6 is distinguished therefrom in particular by the profile of the first pneumatic tyres 5, that of the second pneumatic tyres 11 and the arrangement of the flanges 55.

The interior portion 23 of the first envelopes 15 is now generally concave. This interior portion 23 has a radially outwardly domed general profile. Here this profile is substantially semi-circular. The interior wall 23 has a profile that extends radially on either side of a first heel 35 in two sections 77, each of semi-circular appearance.

Here the first heels 35 have a profile in the general shape of a regular trapezium. The base 39 and the neck 41 are connected to one another with no discontinuity in the profile of the first heels 35.

Each of the lateral portions 27 has a circular arc profile portion 79 that is connected toward the interior to the interior portion 23 of the first envelope 15 and toward the exterior to an arcuate profile portion 81 of opposite curvature via which the lateral portions 27 are connected to the exterior portion 25 of the first envelope 15.

This profile of "S" general shape consisting of the portions 79 and 81 forms an inflection zone that tends to cause the exterior portion 25 to collapse in the event of radially inward loading, compressing the first chamber 19.

The exterior portion 25 is narrow. This exterior portion 25 is substantially the same width as the base 39 of the first heel 35.

Here each of the first pneumatic tyres 5 also has an abutment portion 83 that projects radially outwards from the lower portion 23 of the first envelope 15, inside the first chamber 19. This abutment 83 is adapted to cooperate with a circular groove 85 formed in the exterior portion 25 of the first envelope 15 and opening onto the first chamber 19. This abutment 83 limits the collapse of the exterior portion 25 in the radial direction.

Each first half-seat 69 is formed of a surface the profile of which is a circular arc. The curvature of this portion corresponds to that of the sections 77 of the interior portion 23 of the first envelopes 15. Each of the second half-seats 71 is shaped with a generally frustoconical surface with axis 9 that narrows in the axially outward direction.

The second envelopes 17 are analogous to those from the previous figures except that their interior portion 29 is shaped as two frustoconical portions flared radially outwards and each connected on the one hand to the second heel 37 and on the other hand to the lateral portions 33.

Line III in Table A groups a set of dimensions to be used for example to produce a roller 1 according to FIGS. 9 and 10.

Reference is made to FIGS. 11 and 12.

A further variant of the roller 1 is distinguished from that described with reference to FIGS. 7 and 8 in that each of the first pneumatic tyres 5 has a pair of abutment portions 87 that project radially outwards from the interior portions 23 of the first envelopes 15 in the first chamber 19. This pair of abutment portions 87 cooperates with a pair of radially opposite cylindrical portions to limit the collapse of the exterior portion 25 when the first pneumatic tyres 5 are loaded radially inwards.

Line IV in Table A groups a set of dimensions to be used for example to produce a roller 1 according to FIGS. 11 and 12.

Figure 13:
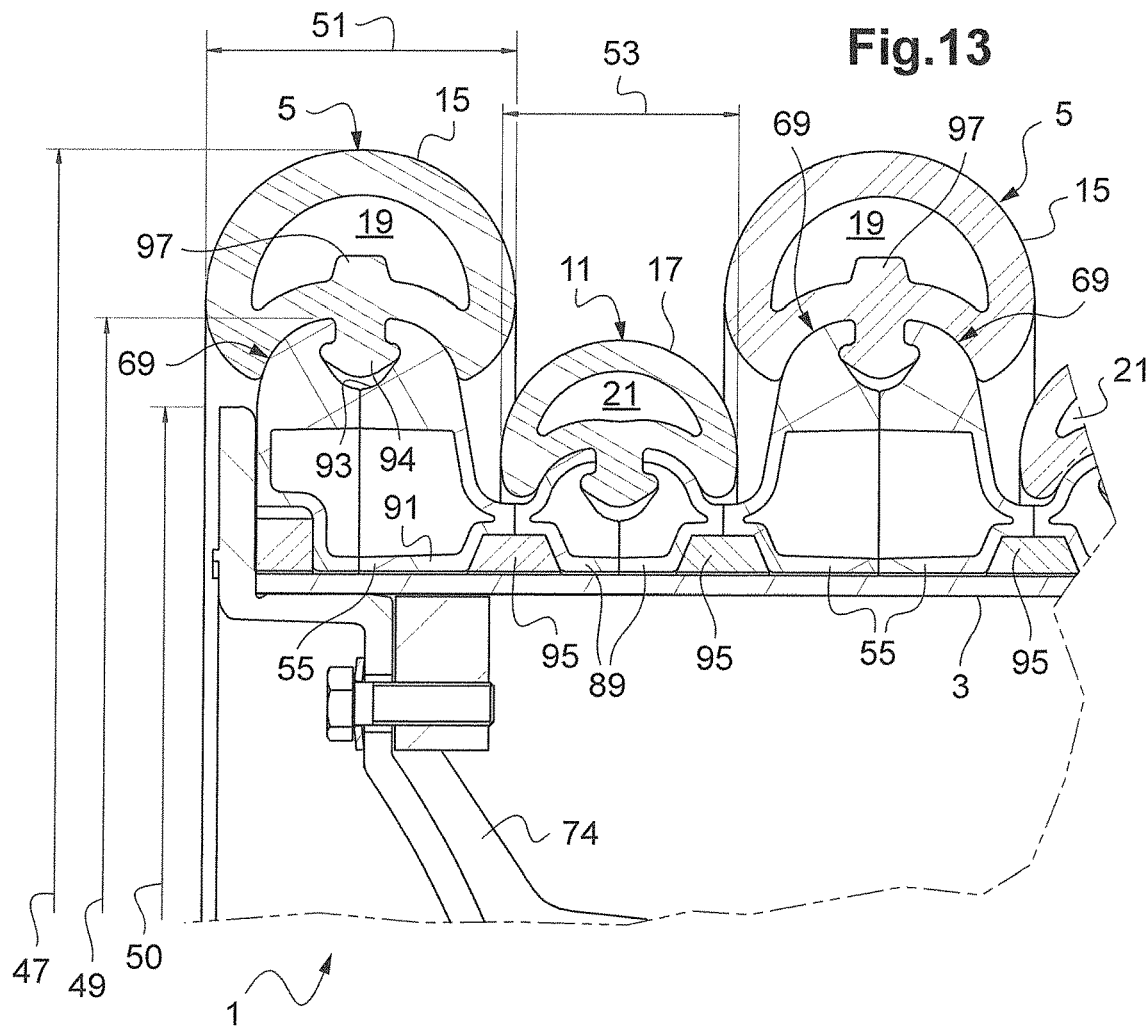
FIGS. 13 and 14 are analogous to FIGS. 7 and 8, respectively, and show a further variant embodiment of the roller from FIGS. 1 to 6.
Figure 14:
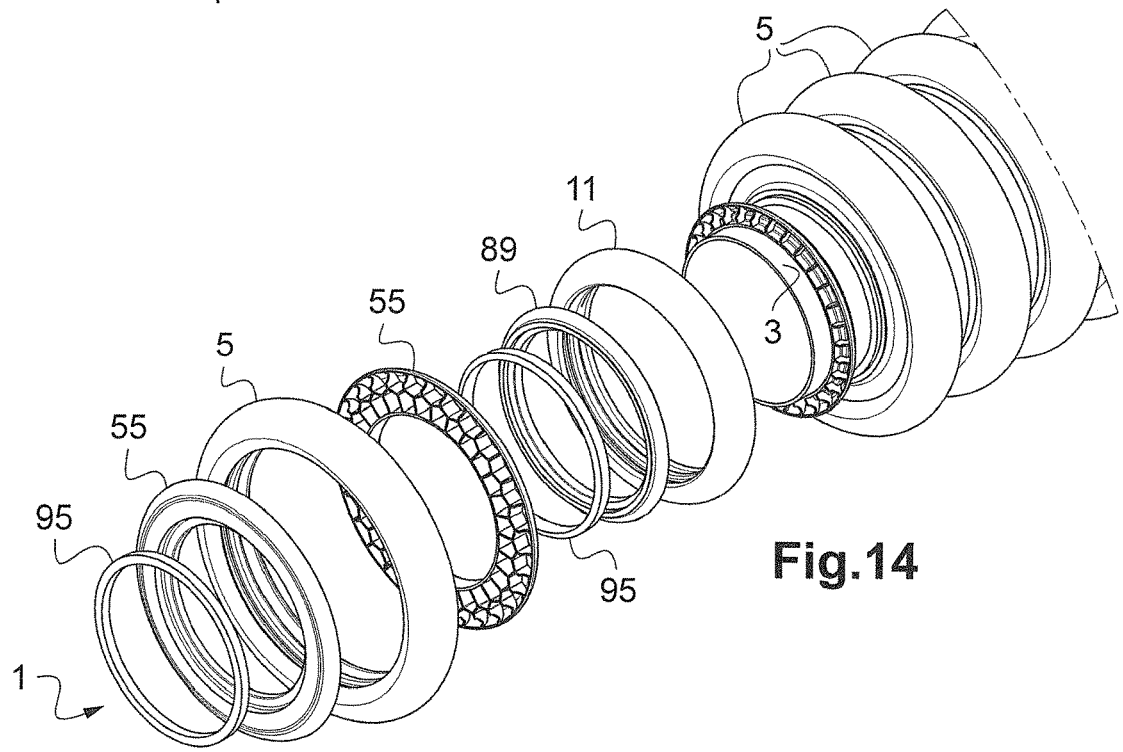

Reference is made to FIGS. 13 and 14.

A further variant of the roller 1 from FIGS. 1 to 6 is distinguished therefrom firstly in that it further comprises a plurality of analogous flanges of a second type, or second flanges 89. The second flanges 89 are threaded around the tubular support 3 in a manner aligned with one another. The second flanges 89 are aligned in the longitudinal direction of the support 3. The second flanges 89 are distributed over the length of the support 3, interleaved between the first flanges 55.

The second flanges 89 are organised into pairs. Each pair of second flanges 89 is interleaved between two adjacent pairs of first flanges 55.

Unlike the roller 1 from FIGS. 1 to 6 in particular, the first pneumatic tyres 5 and the second pneumatic tyres 11 are here each mounted on the support 3 by means of a respective pair of first flanges 55 and a respective pair of second flanges 89. Each of the first pneumatic tyres 5 is mounted on a pair of first flanges 55 that are interleaved between the first heel 35 and the support 3. Each of the second pneumatic tyres 11 is mounted on a pair of second flanges 89 interleaved between the second heel 37 and the support 3.

Each pair of first flanges 55 consists of two first flanges 55 mounted on the support 3 in a mutually adjacent manner. Each of pair of first flanges 55 has an interior peripheral portion that forms a base 91 through which the pair is in contact with the support 3. An exterior peripheral portion of each of these pairs forms a seat for the interior portion 23 of the first envelopes by combining two half-seats 69. This peripheral portion of the pairs of first flanges 55 is domed. It has an apex that is interrupted to define a peripheral slot 93. This peripheral slot 93 receives the first heels 35 of the first pneumatic tyres 5. Through cooperation of shapes, this peripheral slot 93 retains the first pneumatic tyres 5 on the support 3. To this end, the first heels 35 have instead of the base 39 an enlarged head 94, here of mushroom shape, that is attached to the neck 41. This head 94 is adapted to be received in the slot 93.

The second flanges 89 are shaped relative to the second pneumatic tyres 11 in a homologous manner to the first flanges 55 and respectively the first pneumatic tyres 5. The second flanges 89 are smaller than the first flanges 55. The second flanges 89 have an outside diameter significantly less than the outside diameter of the first flanges 55. The second flanges 89 are moreover narrower than the first flanges 55. The second flanges 89 have a width in the axial direction that is significantly less than the width of the first flanges 55.

Here, at each junction between a first flange 55 and a second flange 89, flexible material rings 95 are interleaved on the one hand between the first flanges 55 and the support 3 and on the other hand between the second flanges 89 and the support 3.

The first envelope 15 has a generally concave interior portion 23, here of circular arc shape. The internal face of this interior portion 23 has a shape that corresponds to the combination of two first half-seats 69, here a substantially circular arc shape. The lateral portions 27 and the exterior portion 25 of the envelopes are joined to one another with no discontinuity in curvature, conferring on these portions a generally circular arc profile. In the median zone an abutment portion 97 projects radially outward in the first chamber 19 from the interior portion 23.

The second envelopes 17 have a shape homologous to the first envelopes 15 and proportionately smaller than them. The second envelopes 17 have no internal abutment. Alternatively, the second envelopes 17 have at least one internal abutment.

This embodiment of the roller 1 in which the second envelopes 17 are homologous to the first envelopes 15 may be used when it is a question of conferring on the second pneumatic tyres 11 an agronomic function in addition to or instead of their cleaning function. It may for example be a question of replacing the soil to different depths, on the one hand in the furrows and on the other hand between the furrows. The depth difference corresponds to the radius difference (OD1−OD2)/2 and may be as much as 200 millimetres. To increase this radius difference it will be preferably to increase the height (OD1−ID)/2 of the first pneumatic tyres 5 rather than to increase their inside diameter ID, in order to avoid increasing the height of the bases 91.

Line V in Table A groups a set of dimensions to be used for example for producing a roller 1 according to FIGS. 13 and 14.

Figure 15:
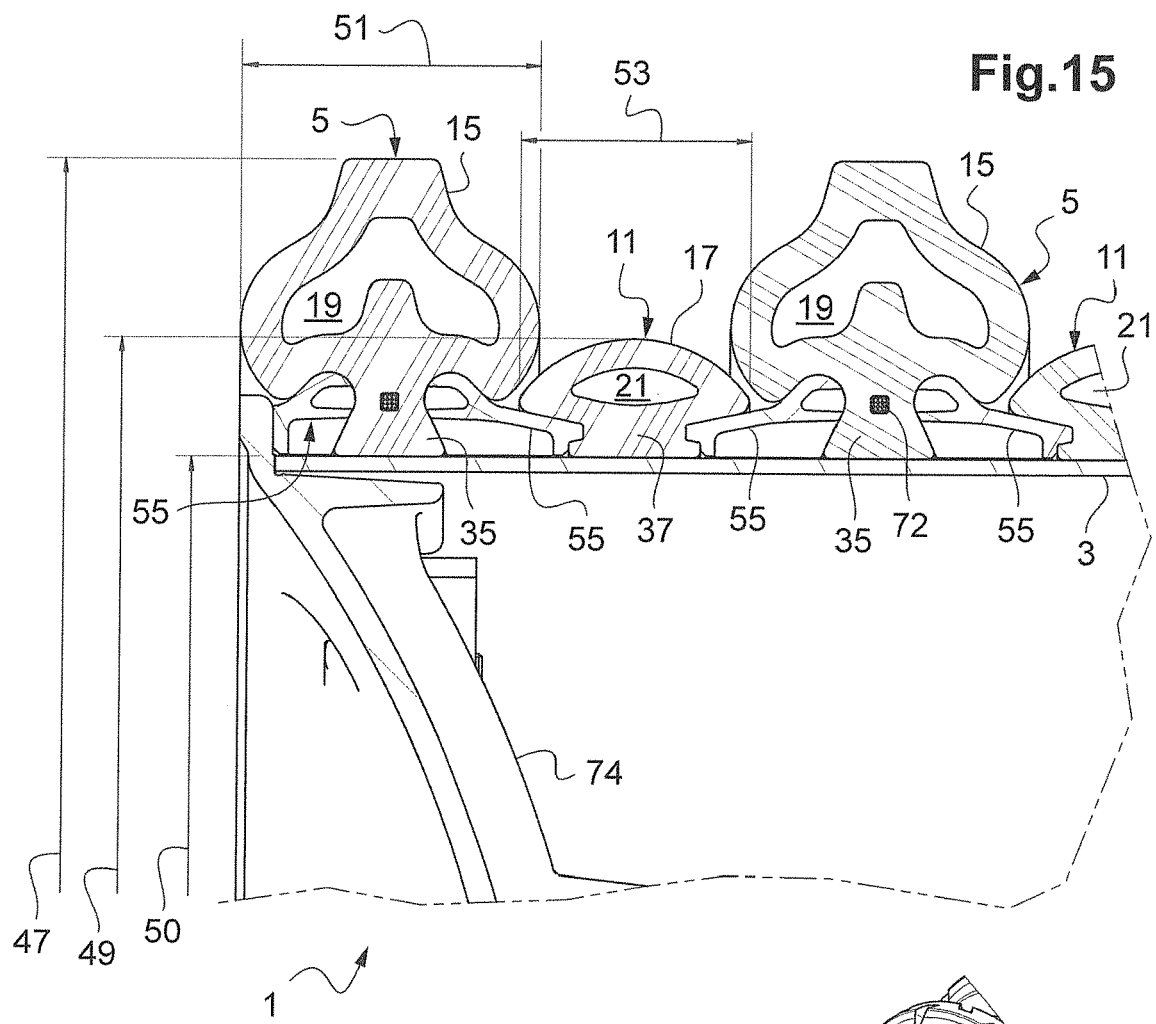
FIGS. 15 and 16 are analogous to FIGS. 7 and 8, respectively, and show a further variant embodiment of the roller from FIGS. 1 to 6.
Figure 16:
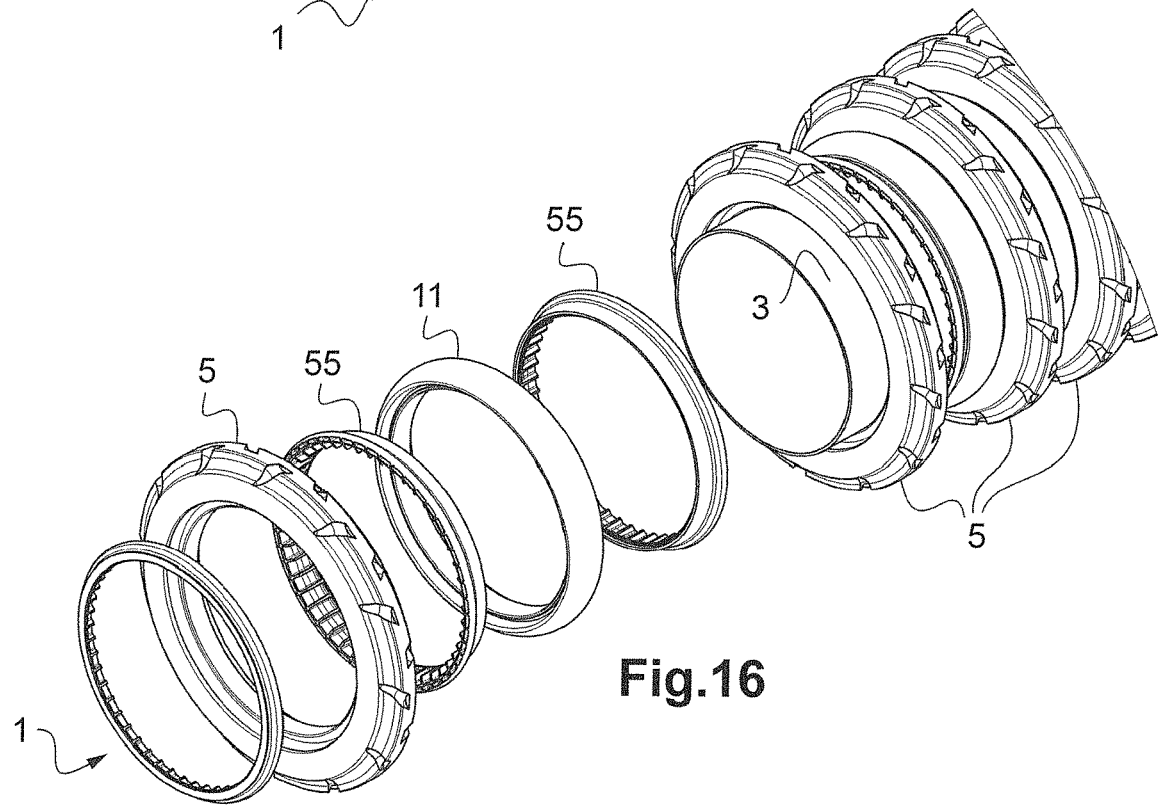

Reference is made to FIGS. 15 and 16.

A variant of the roller 1 from FIGS. 9 and 10 is essentially distinguished therefrom by the dimensions of the first pneumatic tyres 5 and the second pneumatic tyres 11 and the pitch 7.

Line V in Table A groups a set of dimensions to be used for example for producing a roller 1 according to FIGS. 13 and 14.

The variant embodiments of the roller described above with reference to FIGS. 1 to 16 concern a so-called furrower roller. A furrower type roller 1 is equipped with first pneumatic tyres 5 of furrower type, that is to say to be used to form furrows in the soil. The furrower pneumatic tyres leave clearly marked furrow imprints in the soil and compact the furrows to the required depth.

The furrower pneumatic tyres are generally relatively narrow, the width W1 of their first envelope 15 is close to or less than 100 millimetres and this first envelope 15 has a crest appearance.

The furrower pneumatic tyres may be assembled in accordance with pitches P that correspond to the other tools mounted on the machine, for example pitches P of 125, 150, 143 or again 167 millimetres.

The invention is not limited to furrower type rollers 1. The following figures show variant embodiments of the roller 1 intended to replace the soil after sowing for example.

Reference is made to FIGS. 17 and 18.

A variant of the roller 1 from FIGS. 1 to 6 is distinguished therefrom essentially by the shape of the first pneumatic tyres 5. These first pneumatic tyres 5 may for example be used to replace the soil.

The first envelope 15 is significantly wider than in the previous embodiments. Likewise the base 39 and the neck 41 of the first heels 35. The neck 41 now houses two armature elements in the form of two rings 72. The exterior portion 25 is hardly domed at all. This portion 25 has an almost flat profile that causes it to leave furrows in which the soil has been replaced. The lateral portions 27 have a elbow-shaped general profile that provides a transition between the interior portion 23 and the exterior portion 25. Here the first pneumatic tyres 5 are provided with crampons 99, which remain optional.

Reference is made on the one hand to FIGS. 19 and 20 and on the other hand to FIGS. 21 and 22.

Variants of the roller 1 from FIGS. 17 and 18 are essentially distinguished therefrom by the dimensions of the first pneumatic tyres 5 and the second pneumatic tyres 11. Examples of these dimensions are grouped in lines VIII and IX of Table A.

Reference is made to FIGS. 23 and 24.

Another variant of the roller 1 from FIGS. 9 and 10 is distinguished therefrom in particular by the profile of the first pneumatic tyres 5, and of the second pneumatic tyres 11 and the arrangement of the flanges 55.

The flanges 55 are annular and have a generally rectangular profile. Each flange has an exterior peripheral surface 93 and an interior peripheral surface 95 both of which are generally cylindrical. The interior peripheral surface carries a plurality of ribs distributed over that surface that project radially toward the interior of the flange 55. Each flange 55 rests on the supports 3 via these ribs. The interior peripheral surface and the exterior peripheral surface are connected to one another by a pair of curved profile annular surfaces, here of semi-circular shape. These annular surfaces form lateral edges of the flanges 55.

The neck 41 of the first heels 35 and the neck 45 of the second heels 37 take the form of a circular groove open axially on the outside of the first pneumatic tyres 5 and the second pneumatic tyres 11, respectively. The profile of these grooves corresponds to the shape of the lateral edges of the flanges 55, which enables the first pneumatic tyres 5 and the second pneumatic tyres 11 to be axially engaged with the flanges 55 on respective opposite sides of those flanges 55.

The interior portion 23 of the first envelopes 15 now has a generally rectilinear profile. The interior portion 29 of the second envelopes 19 also has a generally rectilinear profile. This interior portion 29 rests on the exterior peripheral surface of two mutually adjacent flanges 55, each of which surfaces acts in the manner of a half-seat, as in the embodiments from FIGS. 9 and 10.

Line X of Table A groups a set of dimensions to be used for example to produce a roller 1 according to FIGS. 23 and 24.

Reference is made to FIG. 25.

It shows a variant embodiment of the roller 1 which is distinguished from that from FIGS. 23 and 24 only by the dimensions of the second pneumatic tyres 11, here the width W2 of the latter.

Line XI of Table A groups a set of dimensions to be used for example to produce a roller 1 according to FIG. 25.

Comparison of lines X and XI of this table and comparison of the figures shows that the width of the second pneumatic tyres 11 may be adapted so as to adjust the pitch P of the first pneumatic tyres 5. There exists a pitch P difference of 17 millimetres between these two variant embodiments. This pitch P difference is entirely the result of a 17 millimetres increase in the width W2 of the second pneumatic tyres 11. Neither the shape nor the dimensions of the flanges are modified, even though these flanges 55 serve as spacers.

In other words, rather than adjusting the pitch P between the first pneumatic tyres 5 by means of spacers, here this pitch P is adjusted by means of the second pneumatic tyres 11, in particular the width W2 of the latter.

Reference is made to FIGS. 26 and 27.

They show respective variant embodiments of the roller 1 from FIGS. 24 and 25.

Here the lower portion 23 of the envelope 15 of the first pneumatic tyres 5 is modified so as to shrink the neck 41 and confer on this lower portion 23 a generally rectilinear profile surface capable of resting on the exterior peripheral surface of the flange 55.

This surface of the flanges 55 serves as a seat both for the first pneumatic tyres 5 and the second pneumatic tyres 11. Consequently, the flanges 55 are widened.

Lines XII and XIII of Table A group a set of dimensions to be used for example to produce a roller 1 according to FIGS. 26 and 27.

These lines show that the width of the flanges 55 is increased without modifying the pitch P of the first pneumatic tyres 5, the width W1 of these pneumatic tyres 5 or the width W2 of the second pneumatic tyres 11.

Tables A and B below group examples of dimensions for the production of rollers conforming to the figures described above.

TABLE A

| | ID mm | P mm | OD1 mm | W1 mm | OD2 mm | W2 mm |
|---|---|---|---|---|---|---|
| I | 406 | 150 | 660 | 85 | 490 | 56 |
| II | 406 | 150 | 610 | 95 | 490 | 56 |
| III | 406 | 150 | 610 | 102 | 488 | 61.4 |
| IV | 406 | 167 | 610 | 95 | 490 | 73 |
| V | 324 | 167 | 600 | 100 | 476 | 76 |
| VI | 406 | 167 | 610 | 102 | 488 | 78.5 |
| VII | 406 | 205 | 570 | 150 | 490 | 56 |
| VIII | 406 | 235 | 570 | 180 | 490 | 56 |
| IX | 406 | 255 | 570 | 200 | 490 | 56 |
| X | 406 | 150 | 600 | 100 | 478 | 62 |
| XI | 406 | 167 | 600 | 100 | 478 | 79 |
| XII | 406 | 150 | 600 | 100 | 478 | 62 |
| XIII | 406 | 167 | 600 | 100 | 478 | 79 |

TABLE B

| | (OD1 − ID)/2 mm | (OD2 − ID)/2 mm | (OD1 − ID2)/2 mm | W1 + W2 mm | W2/W1 % | OD2/OD1 % |
|---|---|---|---|---|---|---|
| I | 127 | 42 | 85 | 141 | 66 | 74 |
| II | 102 | 42 | 60 | 151 | 59 | 80 |
| III | 102 | 41 | 61 | 163.4 | 60 | 80 |
| IV | 102 | 42 | 60 | 168 | 77 | 80 |
| V | 138 | 76 | 62 | 176 | 76 | 80 |
| VI | 102 | 41 | 61 | 180.5 | 77 | 80 |
| VII | 82 | 42 | 40 | 206 | 37 | 86 |
| VIII | 82 | 42 | 40 | 236 | 31 | 86 |
| IX | 82 | 42 | 40 | 256 | 28 | 86 |
| X | 97 | 36 | 61 | 162 | 62 | 80 |
| XI | 97 | 36 | 61 | 179 | 79 | 80 |
| XII | 97 | 36 | 61 | 162 | 62 | 80 |
| XIII | 97 | 36 | 61 | 179 | 79 | 80 |

Tables A and B show a diameter OD2 generally in a range from 60 to 90 percent inclusive of the diameter OD1. However, this must be related to the agricultural function of the first pneumatic tyres 5.

When the first pneumatic tyres 5 act as furrowers, as is the case for the embodiments of lines I to VI for example, the ratio of the diameter OD2 to the diameter OD1 is somewhat small because a large proportion of the first pneumatic tyres 5 must be able to penetrate the soil before reaching a maximum compression ratio on the second pneumatic tyres 11.

The ratio in question is somewhat large in the case of first pneumatic tyres 5 that operate essentially through their exterior portion 25, as is the case for the embodiments of lines VII to XIII (the case for example of first pneumatic tyres 5 intended to replace the soil).

The radius difference between the first pneumatic tyres 5 and the second pneumatic tyres 11 is represented by the magnitude (OD2−OD1)/2. This radius difference corresponds substantially to the depth of the imprint that the first pneumatic tyres 5 leave in use. This radius difference corresponds for example to the depth of a furrow in the case of a furrower type roller. In the embodiments in Tables A and B this difference is between 40 and 85 millimetres inclusive. More generally, this difference is between about 30 and 150 millimetres inclusive. The value of this difference is virtually independent of the diameter of the support 3 and of the pitch P.

Comparing lines I and II to lines VII to IX shows that second pneumatic tyres 11 with analogous shape and dimensions may be employed in combination with first pneumatic tyres 5 of varied shape and function.

The lines of Table A show that the sum of the width W1 of the first pneumatic tyres 5 and the width W2 of the second pneumatic tyres 11 is close to the pitch P, most often lower than the latter. This is in order to prevent zones of the roller 1 being cleaned neither by the deformation of the first pneumatic tyres 5 nor by that of the second pneumatic tyres 11. Care may be taken so that the sum (W1+W2) is at least equal to the pitch P to within 15 percent, preferably to within 10 percent and more preferably to within 8 percent.

If the sum of the width W1 and the width W2 is less than the pitch P (line I), that sum should be less than 1.15 times the pitch P, preferably less than 1.10 times P and more preferably less than 1.7 times P. In fact, in this case, the difference between the pitch P and the sum of the widths W1 and W2 corresponds to an uncleaned zone of the roller, which must be minimised. As the width W1 of the first pneumatic tyres 5 and the pitch P of the latter are generally dictated by agronomic considerations, it is the width W2 of the second pneumatic tyres 11 that will be adapted in order to satisfy the dimensional relations between the sum of the widths W1 and W2 and the pitch P.

If the sum of the width W1 and the width W2 is greater than the pitch P (lines II to XIII) there is no uncleaned zone of the roller 1. In this case it is not necessary to comply with a limit on the sum (W1+W2) that is related to the pitch P, at least, where cleaning of the roller 1 is concerned. Lines II to XIII of Table A nevertheless show an order of magnitude of what might be termed an interference, or overlap, value of the first pneumatic tyres 5 and the second pneumatic tyres 11, represented by the difference (P−(W1+W2)). This overlap is generally between 0.5 and 9 percent inclusive of a pitch P, without that being absolutely necessary to execute the invention.

Comparing lines II and IV, and above all lines VII to IX, which show a significant increase in the pitch P corresponding exactly to an increase in the width W1, shows that the width W2 may be determined in such a manner as to fill the gap between the pitch P and the width W1, which are dimensions related directly to working the soil.

Comparing lines X and XI, or lines XII and XIII, shows that the width W2 of the second pneumatic tyres 11 may be adapted so as to adjust a value of the pitch P with identical first pneumatic tyres 5.

Starting from the lateral portions 27 of the first envelopes 15, and above all at the level of their lower portions 23, there is created between two adjacent first pneumatic tyres 5 a narrow zone the profile of which decreases radially outwards. Because of its shape, this zone is likely to cause accumulation of soil. For the same reason, this zone is difficult to clean. This is why it is advantageous to provide therein pneumatic tyres of the second pneumatic tyres 11 type described above. It is even more advantageous for the diameter OD2 to be less than the maximum diameter of the interior portion 23 of the first pneumatic tyres 5.

In operation, the first pneumatic tyres 5 are deformed without contacting the second pneumatic tyres 11, in particular because the first pneumatic tyres 5 and the second pneumatic tyres 11 are retained in respective seats. These seats contain most of radial the deformation of the pneumatic tyres. The rolling band of the second pneumatic tyres 11 and the level of the interior portion 23 or at least of the part of the latter retained in a seat.

It is important that at the maximum compression of the first pneumatic tyres 5 the second pneumatic tyres 11 are located under the exterior portion 25 of the first envelopes 15. To guarantee this, abutments may be provided in the first chambers 19 in order to limit the compression of the first pneumatic tyres 5.

In operation, the second pneumatic tyres 11 may contact the soil, in particular if the latter is relatively unconsolidated. In this case, these second pneumatic tyres 11 form an abutment against depression of the first pneumatic tyres 5, in the manner of a depth gauge. Their height is taken into consideration so that they therefore participate in adjusting the working depth of the first pneumatic tyres 5. The same applies when it is wished to use the second pneumatic tyres 11 to replace the soil between furrows, for example to cause water therein to rise.

The shape of the heels of the second pneumatic tyres 11 makes it possible to ensure a seal against soil between the tyre and the support 3.

The invention is not limited to the embodiments described above by way of example only. In particular:

Any shape combination between the first pneumatic tyres 5 and the second pneumatic tyres 11 may therefore be envisaged.

The second pneumatic tyres 11 are not necessarily of the semi-hollow type. More generally, the second pneumatic tyres 11 may be of different types, in particular hollow as here (semi-hollow pneumatic tyres) or solid. The pneumatic tyres 11 may notably be replaced by solid tyres. In this case, the second tyres may be flexible, typically through choosing an appropriate material, or even rigid. In this latter case in particular a material with a low coefficient of friction (extremely slippery) could be used to produce the second tyres in order to preserve for them a self-cleaning character. The cleaning of the second pneumatic tyres 11 may in fact result, at least for the most part, from a sliding effect on the material constituting them. The second pneumatic tyres 11 are not necessarily deformable, at least to a degree comparable with the deformation of the first pneumatic tyres 5.

First pneumatic tyres 5 have been described the sidewalls of which are domed outwards, or convex. The domed shape of these sidewalls confers on the pneumatic tyres 11 deformation properties that improve the cleaning capacities thereof. A similar effect can be obtained with first pneumatic tyres 5 the sidewalls of which are domed inwards, or concave.

Values of the pitch P and of the diameter ID of the support 3 are given by way of illustration only. The invention applies in an analogous manner to other values of these magnitudes, for example a pitch P of 125 millimetres and a diameter ID of 168, 355 or 610 millimetres.

The outside diameter OD2 of the pneumatic tyres 11 is between 70 and 90 percent inclusive of the diameter OD1 of the pneumatic tyres 5.

A difference between the outside radius of the pneumatic tyres 5 and the outside radius of the pneumatic tyres 11 is between 30 and 200 millimetres inclusive, preferably between 30 and 150 millimetres inclusive.

The invention claimed is:

1. An agricultural roller comprising:
a tubular support; and
a series of pneumatic tyres mounted on the support, each pneumatic tyre of the series having a respective uninflated envelope, wherein
the agricultural roller further comprises a series of tyres mounted on the support and interleaved in the series of pneumatic tyres, each tyre having a respective envelope, and
the tyres are smaller than the pneumatic tyres while the envelope of the tyres is narrower than the pneumatic tyres.

2. The agricultural roller according to claim 1, wherein the series of pneumatic tyres is mounted on the support at a substantially constant pitch, and
said pitch is within 15 percent of a sum of widths of the envelopes of the pneumatic tyres and the tyres.

3. The agricultural roller according to claim 1, wherein the series of pneumatic tyres is mounted on the support at a substantially constant pitch, and
said pitch is less than a sum of widths of the envelopes of the pneumatic tyres and the tyres.

4. The agricultural roller according to claim 2, wherein the width of the envelope of the tyres is 80 percent less than that of the pneumatic tyres.

5. The agricultural roller according to claim 1, wherein an outside diameter of the tyres is between 70 and 90 percent inclusive of a diameter of the pneumatic tyres.

6. The agricultural roller according to claim 1, wherein the pneumatic tyres or the tyres have a heel to which their envelope is attached, and
said pneumatic tyres or said tyres are retained on the support by said heel.

7. The agricultural roller according to claim 1, further comprising at least one series of flanges organised in pairs, wherein each pair of flanges contributes to retaining a pneumatic tyre or a tyre on the tubular support.

8. The agricultural roller according to claim 7, wherein each of the flanges carries a seat that comes to cap at least a part of the envelope of the pneumatic tyres or the tyres.

9. The agricultural roller according to claim 7, wherein each flange contributes to retaining the pneumatic tyre and the tyre on the tubular support.

10. The agricultural roller according to claim 9, wherein each flange is shaped as at least a portion of a seat for the envelope of the pneumatic tyre and at least a portion of a seat for the envelope of the tyre.

11. The agricultural roller according to claim 7, wherein the pneumatic tyres and the tyres are retained by cooperation of shapes between the flanges and a portion of each pneumatic tyre and of each tyre in the form of a heel.

12. The agricultural roller according to claim 6, wherein the retention of the pneumatic tyre or of the tyre leaves at least a lateral portion of the envelopes free to be deformed.

13. The agricultural roller according to claim 1, wherein a difference between an outside radius of the pneumatic tyres and an outside radius of the tyres is between 30 and 200 millimetres inclusive.

14. The agricultural roller according to claim 1, wherein the respective envelope of at least some of the tyres is of uninflated type.

15. The agricultural roller according to claim 1, wherein the envelope of the tyres is deprived of rigid armature.

* * * * *